United States Patent
Song

(10) Patent No.: US 12,494,240 B2
(45) Date of Patent: Dec. 9, 2025

(54) MEMORY MODULE RELATED TO SIGNAL INTEGRITY OF CLOCK

(71) Applicant: SK hynix Inc., Icheon-si (KR)

(72) Inventor: Choung Ki Song, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 225 days.

(21) Appl. No.: 18/500,937

(22) Filed: Nov. 2, 2023

(65) Prior Publication Data

US 2025/0029643 A1 Jan. 23, 2025

(30) Foreign Application Priority Data

Jul. 18, 2023 (KR) .......................... 10-2023-0093434

(51) Int. Cl.
*G11C 7/22* (2006.01)
*H03K 5/06* (2006.01)
*H03K 21/02* (2006.01)

(52) U.S. Cl.
CPC .............. *G11C 7/222* (2013.01); *G11C 7/225* (2013.01); *H03K 5/06* (2013.01); *H03K 21/02* (2013.01)

(58) Field of Classification Search
CPC ......... G11C 7/222; G11C 7/225; G11C 16/32; G11C 7/1093; G11C 2207/2254; H03K 5/06; H03K 21/02
USPC ........................................................ 365/233.1
See application file for complete search history.

(56) References Cited

U.S. PATENT DOCUMENTS

2006/0171497 A1* 8/2006 Kim ..................... G11C 7/1072
375/376
2009/0115472 A1 5/2009 Pfaff et al.

FOREIGN PATENT DOCUMENTS

KR 1019980071747 A 10/1998

* cited by examiner

*Primary Examiner* — Fernando Hidalgo
(74) *Attorney, Agent, or Firm* — WILLIAM PARK AND ASSOCIATES LTD.

(57) ABSTRACT

A memory module includes a clock driver configured to receive an external clock through a module pin and configured to generate an internal clock that is transmitted to memory chips by delaying a division clock that is generated from the external clock by a clock delay interval. The clock driver adjusts the clock delay interval by comparing the phase of the division clock and the phase of a feedback division clock that is generated from the internal clock.

20 Claims, 21 Drawing Sheets

MEMORY MODULE RELATED TO SIGNAL INTEGRITY OF CLOCK

CROSS-REFERENCE TO RELATED APPLICATION

The present application claims priority under 35 U.S.C. § 119 (a) to Korean Patent Application No. 10-2023-0093434, filed in the Korean Intellectual Property Office on Jul. 18, 2023, the entire disclosure of which is incorporated herein by reference.

BACKGROUND

1. Technical Field

The present disclosure generally relates to a memory module, and more particularly, to a memory module related to the signal integrity of a clock.

2. Related Art

In general, a memory module includes multiple memory chips, and is mounted on a substrate. Each of the memory chips included in the memory module may perform various internal operations by receiving a clock, a command, and an address from a memory controller. When the clock, the command, and the address are applied from the memory controller to the memory chips, signal integrity (SI) needs to be secured. In particular, as the operating speed of the memory module is increased, it becomes more important to secure the signal integrity of a clock that is applied at a high frequency.

SUMMARY

In an embodiment, a memory module may include a clock driver configured to receive an external clock through a module pin and configured to generate an internal clock that is transmitted to memory chips by delaying a division clock that is generated from the external clock by a clock delay interval. In an embodiment, the clock driver may adjust the clock delay interval by comparing the phase of the division clock and the phase of a feedback division clock that is generated from the internal clock.

In an embodiment, a memory module may include a clock driver configured to receive an external clock through a module pin and configured to generate an internal clock that is transmitted to memory chips by delaying a division clock that is generated from the external clock by a clock delay interval. In an embodiment, the clock driver may adjust the clock delay interval by comparing the phase of an external buffer clock that is generated from the external clock and the phase of a feedback buffer clock that is generated from the internal clock.

In an embodiment, a memory module may include a clock driver configured to receive an external clock through a module pin and configured to generate an internal clock that is transmitted to memory chips by delaying a division clock that is generated from the external clock by a clock delay interval. In an embodiment, the clock driver may include a first phase detection circuit configured to generate a first delay control signal by comparing the phases of the division clock and a feedback division clock, a first clock delay circuit configured to generate a first selection delay division clock by delaying the division clock by a first clock delay interval that is set based on the first delay control signal and a driving control signal, a second phase detection circuit configured to generate a second delay control signal by comparing the phases of the division clock and the feedback division clock, and a second clock delay circuit configured to generate a second selection delay division clock by delaying the division clock by a second clock delay interval that is set based on the second delay control signal and the driving control signal.

In an embodiment, a memory module may include a clock driver configured to receive an external clock through a module pin and configured to generate an internal clock that is transmitted to memory chips by delaying a division clock that is generated from the external clock by a clock delay interval. In an embodiment, the clock driver may include a phase detection circuit configured to generate a delay control signal by comparing the phases of the division clock and a feedback division clock, a first clock delay circuit configured to generate a first selection delay division clock by delaying the division clock by a first clock delay interval that is set based on the delay control signal and a driving control signal, and a second clock delay circuit configured to generate a second selection delay division clock by delaying the division clock by a second clock delay interval that is set based on the delay control signal and the driving control signal.

In an embodiment, a memory module may include a clock driver configured to receive an external clock through a module pin and configured to generate an internal clock that is transmitted to memory chips by delaying an external buffer clock that is generated from the external clock by a clock delay interval. In an embodiment, the clock driver may adjust the clock delay interval by comparing the phase of the external buffer clock and the phase of a feedback buffer clock that is generated from the internal clock.

DETAILED DESCRIPTION

In the descriptions of the following embodiments, the term "preset" indicates that the numerical value of a parameter is previously decided, when the parameter is used in a process or algorithm. According to an embodiment, the numerical value of the parameter may be set when the process or algorithm is started or while the process or algorithm is performed.

Terms such as "first" and "second," which are used to distinguish among various components, are not limited by the components. For example, a first component may be referred to as a second component, and vice versa.

When one component is referred to as being "coupled" or "connected" to another component, it should be understood that the components may be directly coupled or connected to each other or coupled or connected to each other through another component interposed therebetween. In contrast, when one component is referred to as being "directly coupled" or "directly connected" to another component, it should be understood that the components are directly coupled or connected to each other without another component interposed therebetween.

A "logic high level" and a "logic low level" are used to describe the logic levels of signals. A signal having a "logic high level" is distinguished from a signal having a "logic low level." For example, when a signal having a first voltage corresponds to a signal having a "logic high level," a signal having a second voltage may correspond to a signal having a "logic low level." According to an embodiment, a "logic high level" may be set to a voltage higher than a "logic low level." According to an embodiment, the logic levels of signals may be set to different logic levels or opposite logic levels. For example, a signal having a logic high level may be set to have a logic low level in some embodiments, and a signal having a logic low level may be set to have a logic high level in some embodiments.

A "logic bit set" may mean a combination of logic levels of bits included in a signal. When a logic level of each of the bits included in the signal is changed, a logic bit set of the signal may be differently set. For example, if two bits are included in a signal, a logic bit set of the signal may be set as a first logic bit set when logic levels of the two bits included in the signal are a "logic low level" and a "logic low level", and may be set as a second logic bit set when logic levels of the two bits included in the signal are a "logic low level", and a "logic high level."

Hereafter, the present disclosure will be described in more detail through embodiments. The embodiments are only used to exemplify the present disclosure, and the scope of the present disclosure is not limited by the embodiments.

Figure 1:
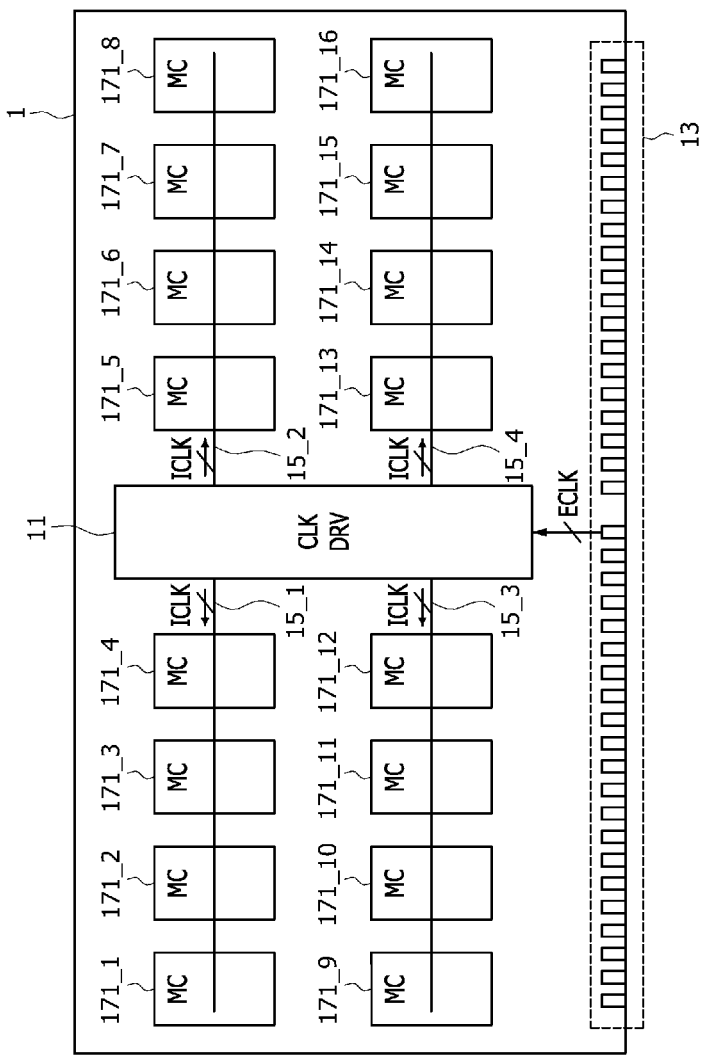
FIG. 1 is a block diagram illustrating a construction of a memory module according to an example of the present disclosure.

FIG. 1 is a block diagram illustrating a construction of a memory module 1 according to an example of the present disclosure. As illustrated in FIG. 1, the memory module 1 may include a clock driver (CLK DRV) 11, a module pin 13, clock lines 15_1 to 15_4, and memory chips (MC) 171_1 to 171_16.

The clock driver 11 may receive an external clock ECLK that is applied by a memory controller (61 in FIG. 19) through the module pin 13. The clock driver 11 may generate an internal clock ICLK that is transmitted to the memory chips 171_1 to 171_16 by delaying a division clock (DCLK in FIG. 2) that is generated from the external clock ECLK. The clock driver 11 may adjust a clock delay interval in which the division clock (DCLK in FIG. 2) is delayed by comparing the phases of the division clock (DCLK in FIG. 2) and a feedback division clock (FDCLK in FIG. 2) that is generated from the internal clock ICLK. The clock driver 11 can secure the signal integrity of the internal clock ICLK by removing a jitter occurring in the internal clock ICLK in a way to adjust the clock delay interval in which the division clock (DCLK in FIG. 2) is delayed through a comparison between the phases of the division clock (DCLK in FIG. 2) and the feedback division clock (FDCLK in FIG. 2) when a jitter occurs in the internal clock ICLK because a voltage and a temperature are changed.

The clock driver 11 may transmit the internal clock ICLK to the memory chips 171_1 to 171_16 through the clock lines 15_1 to 15_4. The clock lines 15_1 to 15_4 may include a first clock line 15_1, a second clock line 15_2, a third clock line 15_3 and a fourth clock line 15_4. The memory chips 171_1 to 171_16 may include a first memory chip group 171_1, 171_2, 171_3, and 171_4, a second memory chip group 171_5, 171_6, 171_7, and 171_8, a third memory chip group 171_9, 171_10, 171_11, and 171_12, and a fourth memory chip group 171_13, 171_14, 171_15, and 171_16. The clock driver 11 may transmit the internal clock ICLK to the first memory chip group 171_1, 171_2, 171_3, and 171_4 through the first clock line 15_1. The clock driver 11 may transmit the internal clock ICLK to the second memory chip group 171_5, 171_6, 171_7, and 171_8 through the second clock line 15_2. The clock driver 11 may transmit the internal clock ICLK to the third memory chip group 171_9, 171_10, 171_11, and 171_12 through the third clock line 15_3. The clock driver 11 may transmit the internal clock ICLK to the fourth memory chip group 171_13, 171_14, 171_15, and 171_16 through the fourth clock line 15_4.

Figure 2:
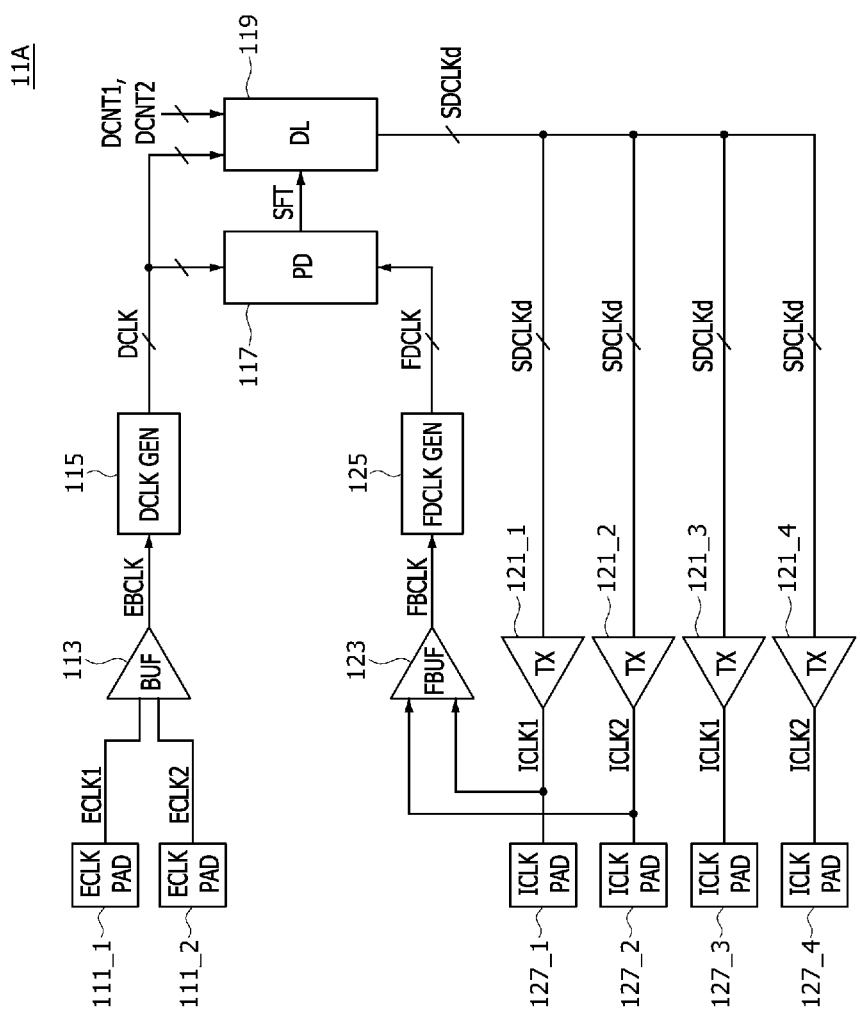
FIG. 2 is a block diagram illustrating a construction of a clock driver according to an example of the present disclosure.

FIG. 2 is a block diagram illustrating a construction of a clock driver 11A according to an example of the clock driver 11. As illustrated in FIG. 2, the clock driver 11A may include external clock pads (ECLK PAD) 111_1 and 111_2, a clock buffer (BUF) 113, a division clock generation circuit (DCLK GEN) 115, a phase detection circuit (PD) 117, a clock delay circuit (DL) 119, clock transmission circuits (TX) 121_1 to 121_4, a feedback buffer (FBUF) 123, a feedback division clock generation circuit (FDCLK GEN) 125, and internal clock pads (ICLK PAD) 127_1 to 127_4.

The clock driver 11A may receive external clocks ECLK1 and ECLK2 that are applied by the memory controller (61 in FIG. 19), through the external clock pads 111_1 and 111_2. The external clocks ECLK1 and ECLK2 may include a first external clock ECLK1 and a second external clock ECLK2. The first external clock ECLK1 may be received through the external clock pad 111_1. The second external clock ECLK2 may be received through the external clock pad 111_2. The phases of the first external clock ECLK1 and the second external clock ECLK2 may be inverted with respect to each other, but this is only an embodiment and the present disclosure is not limited to the embodiment.

The clock buffer 113 may be connected to the external clock pads 111_1 and 111_2, and may receive the first external clock ECLK1 and the second external clock ECLK2 from the external clock pads 111_1 and 111_2. The clock buffer 113 may generate an external buffer clock EBCLK based on the first external clock ECLK1 and the second external clock ECLK2. The clock buffer 113 may be implemented to generate the external buffer clock EBCLK by differentially amplifying the first external clock ECLK1 and the second external clock ECLK2, but this is only an embodiment and the present disclosure is not limited to the embodiment.

The division clock generation circuit 115 may be connected to the clock buffer 113, and may receive the external buffer clock EBCLK from the clock buffer 113. The division clock generation circuit 115 may generate the division clock DCLK based on the external buffer clock EBCLK. The division clock DCLK may be generated as a "2N" division signal of the external buffer clock EBCLK. The division clock DCLK may be set to have a cycle that is "2N" times greater than the cycle of the external buffer clock EBCLK. In this case, "N" may be set as a natural number. The division clock DCLK may include multiple division clocks. A difference between the phases of the division clocks that are included in the division clock DCLK and the number of division clocks may be variously set according to an embodiment.

The phase detection circuit 117 may be connected to the division clock generation circuit 115 and the feedback division clock generation circuit 125, and may receive the division clock DCLK from the division clock generation circuit 115 and receive the feedback division clock FDCLK from the feedback division clock generation circuit 125. The phase detection circuit 117 may generate a delay control signal SFT based on the division clock DCLK and the feedback division clock FDCLK. The phase detection circuit 117 may generate the delay control signal SFT for adjusting the clock delay interval of the clock delay circuit 119 by comparing the phases of the division clock DCLK and the feedback division clock FDCLK. The delay control signal SFT may be implemented to have one bit or multiple bits according to an embodiment. The logic level of the delay control signal SFT for adjusting the clock delay interval of the clock delay circuit 119 or a logic bit set of bits that are included in the delay control signal SFT may be variously set according to an embodiment. For example, the phase detection circuit 117 may generate the delay control signal SFT the logic level or logic bit set of which is set in order to increase the clock delay interval when the phase of the division clock DCLK is faster than the phase of the feedback division clock FDCLK. As another example, the phase detection circuit 117 may generate the delay control signal SFT the logic level or logic bit set of which is set in order to decrease the clock delay interval when the phase of the division clock DCLK is slower than the phase of the feedback division clock FDCLK. As still another example, the phase detection circuit 117 may generate the delay control signal SFT the logic level or logic bit set of which is set in order to maintain the clock delay interval when the phase of the division clock DCLK is the same as the phase of the feedback division clock FDCLK.

The clock delay circuit 119 may be connected to the phase detection circuit 117, and may receive the delay control signal SFT from the phase detection circuit 117. The clock delay circuit 119 may generate a selection delay division clock SDCLKd by delaying the division clock DCLK by the clock delay interval that is set based on the delay control signal SFT and a driving control signal DCNT1 and DCNT2. The clock delay circuit 119 may generate a first delay division clock (DCLKd1 in FIG. 3) by delaying the division clock DCLK by a first sub-delay interval based on the delay control signal SFT. The clock delay circuit 119 may include unit delayers (UD1(1) to UD1 (16) in FIG. 4) each having a unit delay interval, and may adjust the first sub-delay interval based on the logic level or logic bit set of the delay control signal SFT. For example, when the delay control signal SFT for increasing the clock delay interval is generated in the state in which the first sub-delay interval has been set as seven times the unit delay interval, the first sub-delay interval may be adjusted to become eight times the unit delay interval. As another example, when the delay control signal SFT for decreasing the clock delay interval is generated in the state in which the first sub-delay interval has been set as seven times the unit delay interval, the first sub-delay interval may be adjusted to become six times the unit delay interval. The clock delay circuit 119 may generate a second delay division clock (DCLKd2 in FIG. 3) by delaying the division clock DCLK by a second sub-delay interval based on the delay control signal SFT. The clock delay circuit 119 may include unit delayers (UD2(1) to UD2 (16) in FIG. 4) each having a unit delay interval, and may adjust the second sub-delay interval based on the logic level or logic bit set of the delay control signal SFT. For example, when the delay control signal SFT for increasing the clock delay interval is generated in the state in which the second sub-delay interval has been set as eight times the unit delay interval, the second sub-delay interval may be set as nine times the unit delay interval. As another example, when the delay control signal SFT for decreasing the clock delay interval is generated in the state in which the second sub-delay interval has been set as eight times the unit delay interval, the second sub-delay interval may be set as seven times the unit delay interval. It is preferred that the second sub-delay interval is set to be greater than the first sub-delay interval. In the present embodiment, the second sub-delay interval has been set to be greater than the first sub-delay interval by the unit delay interval, but this is only an embodiment and the present disclosure is not limited to the embodiment. The clock delay circuit 119 may adjust the clock delay interval to an interval between the first sub-delay interval and the second sub-delay interval based on the driving control signal DCNT1 and DCNT2. The driving control signal DCNT1 and DCNT2 may include a first driving control signal DCNT1 and a second driving control signal DCNT2. The first driving control signal DCNT1 and the second driving control signal DCNT2 may be generated within the memory module 1 or may be applied from the outside of the memory module 1, for example, the memory controller (61 in FIG. 19) or a test device (not illustrated). The clock delay circuit 119 may drive the selection delay division clock SDCLKd by first driving power that is set by the first driving control signal DCNT1, based on the first delay division clock (DCLKd1 in FIG. 3). The clock delay circuit 119 may drive the selection delay division clock SDCLKd by second driving power that is set by the second driving control signal DCNT2, based on the second delay division clock (DCLKd2 in FIG. 3). The first driving control signal DCNT1 and the second driving control signal DCNT2 may each include multiple bits. Driving power for driving the selection delay division clock SDCLKd may be adjusted based on a logic bit set of bits that are included in each of the first driving control signal DCNT1 and the second driving control signal DCNT2.

The clock transmission circuits 121_1 to 121_4 may be connected to the clock delay circuit 119, and may receive the selection delay division clock SDCLKd from the clock delay circuit 119. The clock transmission circuits 121_1 to 121_4 may generate an internal clock ICLK1 and ICLK2 based on the selection delay division clock SDCLKd. The clock transmission circuits 121_1 to 121_4 may include a first clock transmission circuit 121_1, a second clock transmission circuit 121_2, a third clock transmission circuit 121_3, and a fourth clock transmission circuit 121_4. The internal clock pads 127_1 to 127_4 may include a first internal clock pad 127_1, a second internal clock pad 127_2, a third internal clock pad 127_3, and a fourth internal clock pad 127_4. The internal clock ICLK1 and ICLK2 may include a first internal clock ICLK1 and a second internal clock ICLK2. The first clock transmission circuit 121_1 may generate the first internal clock ICLK1 from the selection delay division clock SDCLKd and output the first internal clock ICLK1 to the first internal clock pad 127_1. The first clock transmission circuit 121_1 may be implemented to generate the first internal clock ICLK1 having the same phase as the selection delay division clock SDCLKd. The second clock transmission circuit 121_2 may generate the second internal clock ICLK2 from the selection delay division clock SDCLKd and output the second internal clock ICLK2 to the second internal clock pad 127_2. The second clock transmission circuit 121_2 may be implemented to generate the second internal clock ICLK2 having a phase opposite to the phase of the selection delay division clock SDCLKd. The third clock transmission circuit 121_3 may generate the first internal clock ICLK1 from the selection delay division clock SDCLKd and output the first internal clock ICLK1 to the third internal clock pad 127_3. The third clock transmission circuit 121_3 may be implemented to generate the first internal clock ICLK1 having the same phase as the selection delay division clock SDCLKd. The fourth clock transmission circuit 121_4 may generate the second internal clock ICLK2 from the selection delay division clock SDCLKd and output the second internal clock ICLK2 to the fourth internal clock pad 127_4. The fourth clock transmission circuit 121_4 may be implemented to generate the second internal clock ICLK2 having a phase opposite to the phase of the selection delay division clock SDCLKd. According to an embodiment, the first clock transmission circuit 121_1 and the third clock transmission circuit 121_3 may each be implemented to generate the first internal clock ICLK1 that has been set to have the same frequency as each of the first external clock ECLK1 and the second external clock ECLK2, based on the selection delay division clock SDCLKd. According to an embodiment, the second clock transmission circuit 121_2 and the fourth clock transmission circuit 121_4 may each be implemented to generate the second internal clock ICLK2 that has been set to have the same frequency as each of the first external clock ECLK1 and the second external clock ECLK2, based on the selection delay division clock SDCLKd.

The feedback buffer 123 may be connected to the first clock transmission circuit 121_1 and the second clock transmission circuit 121_2, and may receive the first internal clock ICLK1 from the first clock transmission circuit 121_1 and receive the second internal clock ICLK2 from the second clock transmission circuit 121_2. The feedback buffer 123 may generate a feedback buffer clock FBCLK based on the first internal clock ICLK1 and the second internal clock ICLK2. The feedback buffer 123 may be implemented to generate the feedback buffer clock FBCLK by differentially amplifying the first internal clock ICLK1 and the second internal clock ICLK2, but this is only an embodiment and the present disclosure is not limited to the embodiment. The feedback buffer 123 may be implemented identically with the clock buffer 113.

The feedback division clock generation circuit 125 may be connected to the feedback buffer 123, and may receive the feedback buffer clock FBCLK from the feedback buffer 123. The feedback division clock generation circuit 125 may generate the feedback division clock FDCLK based on the feedback buffer clock FBCLK. The feedback division clock FDCLK may be generated as a "2N" division signal of the feedback buffer clock FBCLK. The feedback division clock FDCLK may be set to have a cycle that is "2N" times greater than the cycle of the feedback buffer clock FBCLK. In this case, "N" may be set as a natural number. The feedback division clock FDCLK may include multiple division clocks. A difference between the phases of the division clocks included in the feedback division clock FDCLK and the number of division clocks may be variously set according to an embodiment. The feedback division clock generation circuit 125 may be implemented identically with the division clock generation circuit 115. The feedback division clock generation circuit 125 may be connected to the phase detection circuit 117, and may transmit the feedback division clock FDCLK to the phase detection circuit 117.

Figure 3:
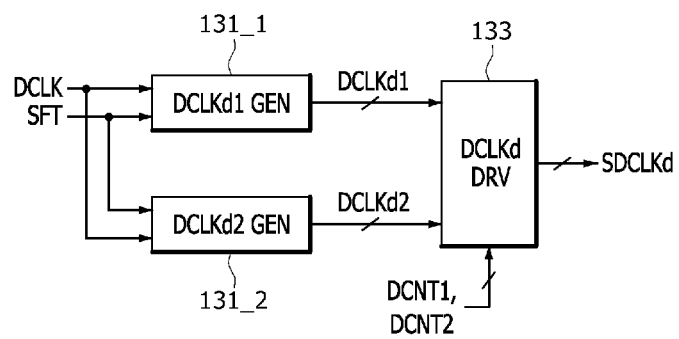
FIG. 3 is a block diagram illustrating a construction of a clock delay circuit according to an example of the present disclosure.

FIG. 3 is a block diagram illustrating a construction of a clock delay circuit 119A according to an example of the clock delay circuit 119. As illustrated in FIG. 3, the clock delay circuit 119A may include a first delay division clock generation circuit (DCLKd1 GEN) 131_1, a second delay division clock generation circuit (DCLKd2 GEN) 131_2, and a delay division clock driving circuit (DCLKd DRV) 133.

The first delay division clock generation circuit 131_1 may generate the first delay division clock DCLKd1 by delaying the division clock DCLK by a first sub-delay interval based on the delay control signal SFT. The first delay division clock generation circuit 131_1 may include the unit delayers (UD1(1) to UD1 (16) in FIG. 4) each having a unit delay interval, and may generate the first delay division clock DCLKd1 by delaying the division clock DCLK by the first sub-delay interval. The first sub-delay interval may be set as an initial delay interval and adjusted based on the delay control signal SFT. For example, when the delay control signal SFT for increasing the clock delay interval is generated in the state in which the initial delay interval of the first sub-delay interval has been set as seven times the unit delay interval, the first delay division clock generation circuit 131_1 may generate the first delay division clock DCLKd1 by delaying the division clock DCLK by the first sub-delay interval that has been adjusted to be eight times the unit delay interval. As another example, when the delay control signal SFT for decreasing the clock delay interval is generated in the state in which the initial delay interval of the first sub-delay interval has been set as seven times the unit delay interval, the first delay division clock generation circuit 131_1 may generate the first delay division clock DCLKd1 by delaying the division clock DCLK by the first sub-delay interval that has been adjusted to be six times the unit delay interval.

The second delay division clock generation circuit 131_2 may generate the second delay division clock DCLKd2 by delaying the division clock DCLK by a second sub-delay interval based on the delay control signal SFT. The second delay division clock generation circuit 131_2 may include the unit delayers (UD2(1) to UD2 (16) in FIG. 4) each having a unit delay interval, and may generate the second delay division clock DCLKd2 by delaying the division clock DCLK by a second sub-delay interval. The second sub-delay interval may be set as an initial delay interval and adjusted based on the delay control signal SFT. For example, when the delay control signal SFT for increasing the clock delay interval is generated in the state in which the initial delay interval of the second sub-delay interval has been set as eight times the unit delay interval, the second delay division clock generation circuit 131_2 may generate the second delay division clock DCLKd2 by delaying the division clock DCLK by the second sub-delay interval that has been adjusted to be nine times the unit delay interval. As another example, when the delay control signal SFT for decreasing the clock delay interval is generated in the state in which the initial delay interval of the second sub-delay interval has been set as eight times the unit delay interval, the second delay division clock generation circuit 131_2 may generate the second delay division clock DCLKd2 by delaying the division clock DCLK by the second sub-delay interval that has been adjusted to be seven times the unit delay interval.

The delay division clock driving circuit 133 may be connected to the first delay division clock generation circuit 131_1 and the second delay division clock generation circuit 131_2, and may receive the first delay division clock DCLKd1 from the first delay division clock generation circuit 131_1 and receive the second delay division clock DCLKd2 from the second delay division clock generation circuit 131_2. The delay division clock driving circuit 133 may receive the first delay division clock DCLKd1, and may drive the selection delay division clock SDCLKd by first driving power that is set by the first driving control signal DCNT1. The delay division clock driving circuit 133 may receive the second delay division clock DCLKd2, and may drive the selection delay division clock SDCLKd by the second driving power that is set by the second driving control signal DCNT2.

Figure 4:
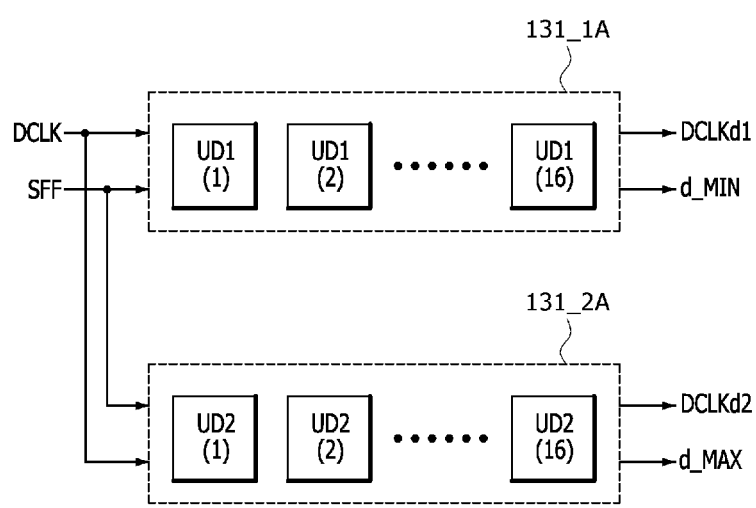
FIG. 4 is a block diagram illustrating a construction of delay division clock generation circuits according to an example of the present disclosure.

FIG. 4 is a block diagram illustrating a construction of a first delay division clock generation circuit 131_1A and a second delay division clock generation circuit 131_2A according to examples of the first delay division clock generation circuit 131_1 and the second delay division clock generation circuit 131_2.

The first delay division clock generation circuit 131_1A may include the unit delayers UD1(1) to UD1 (16) each having a unit delay interval. The first delay division clock generation circuit 131_1A may generate the first delay division clock DCLKd1 by delaying the division clock DCLK by a first sub-delay interval based on the delay control signal SFT. The first delay division clock generation circuit 131_1A may generate the first delay division clock DCLKd1 by delaying the division clock DCLK by the first sub-delay interval that has been set as an initial delay interval. For example, in the state in which the initial delay interval of the first sub-delay interval has been set as seven times the unit delay interval, the first delay division clock generation circuit 131_1A may generate the first delay division clock DCLKd1 by delaying the division clock DCLK through the unit delayers UD1(1) to UD1(7). The first delay division clock generation circuit 131_1A may generate the first delay division clock DCLKd1 by delaying the division clock DCLK by the first sub-delay interval that is adjusted based on the delay control signal SFT. For example, when the delay control signal SFT for increasing the clock delay interval is generated in the state in which the initial delay interval of the first sub-delay interval has been set as seven times the unit delay interval, the first delay division clock generation circuit 131_1A may generate the first delay division clock DCLKd1 by delaying the division clock DCLK through the unit delayers UD1(1) to UD1(8). As another example, when the delay control signal SFT for decreasing the clock delay interval is generated in the state in which the initial delay interval of the first sub-delay interval has been set as seven times the unit delay interval, the first delay division clock generation circuit 131_1A may generate the first delay division clock DCLKd1 by delaying the division clock DCLK through the unit delayers UD1(1) to UD1(6). The first delay division clock generation circuit 131_1A may generate a minimum limit excess signal d_MIN that is activated when the first sub-delay interval cannot be adjusted based on the delay control signal SFT. For example, the first delay division clock generation circuit 131_1A may generate the minimum limit excess signal d_MIN that is activated when the delay control signal SFT for decreasing the clock delay interval is generated in the state in which the first sub-delay interval has been set as one time the unit delay interval.

The second delay division clock generation circuit 131_2A may include the unit delayers UD2(1) to UD2 (16) each having a unit delay interval. The second delay division clock generation circuit 131_2A may generate the second delay division clock DCLKd2 by delaying the division clock DCLK by a second sub-delay interval based on the delay control signal SFT. The second delay division clock generation circuit 131_2A may generate the second delay division clock DCLKd2 by delaying the division clock DCLK by the second sub-delay interval that has been set as an initial delay interval. For example, the second delay division clock generation circuit 131_2A may generate the second delay division clock DCLKd2 by delaying the division clock DCLK through the unit delayers UD2(1) to UD2(8) in the state in which the initial delay interval of the second sub-delay interval has been set as eight times the unit delay interval. The second delay division clock generation circuit 131_2A may generate the second delay division clock DCLKd2 by delaying the division clock DCLK by the second sub-delay interval that is adjusted based on the delay control signal SFT. For example, when the delay control signal SFT for increasing the clock delay interval is generated in the state in which the initial delay interval of the second sub-delay interval has been set as eight times the unit delay interval, the second delay division clock generation circuit 131_2A may generate the second delay division clock DCLKd2 by delaying the division clock DCLK through the unit delayers UD2(1) to UD2(9). As another example, when the delay control signal SFT for decreasing the clock delay interval is generated in the state in which the initial delay interval of the second sub-delay interval has been set as eight times the unit delay interval, the second delay division clock generation circuit 131_2A may generate the second delay division clock DCLKd2 by delaying the division clock DCLK through the unit delayers UD2(1) to UD2(7). The second delay division clock generation circuit 131_2A may generate a maximum limit excess signal d_MAX that is activated when the second sub-delay interval cannot be adjusted based on the delay control signal SFT. For example, the second delay division clock generation circuit 131_2A may generate the maximum limit excess signal d_MAX that is activated when the delay control signal SFT for increasing the clock delay interval is generated in the state in which the second sub-delay interval has been set as 16 times the unit delay interval.

FIGS. 5 to 9 are diagrams for describing operations of the first delay division clock generation circuit 131_1A and the second delay division clock generation circuit 131_2A according to an example of the present disclosure.

Figure 5:
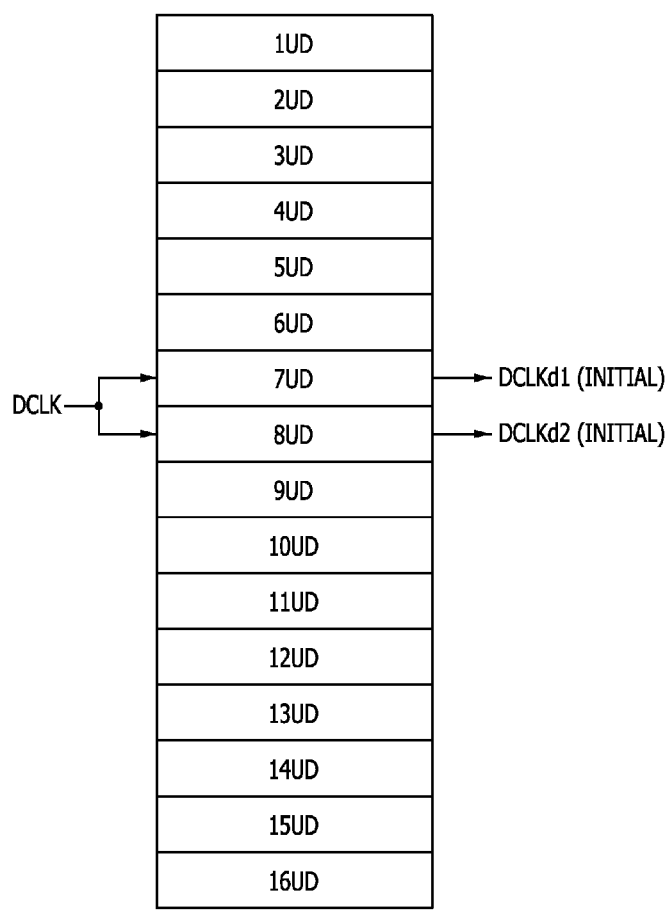
FIGS. 5 to 9 are diagrams for describing an operation of the delay division clock generation circuit according to an example of the present disclosure.

As illustrated in FIG. 5, in the state in which the initial delay interval of the first sub-delay interval has been set as seven times the unit delay interval and the initial delay interval of the second sub-delay interval has been set as eight times the unit delay interval, the first delay division clock generation circuit 131_1A may generate the first delay division clock DCLKd1 by delaying the division clock DCLK through seven unit delayers 7UD. The second delay division clock generation circuit 131_2A may generate the second delay division clock DCLKd2 by delaying the division clock DCLK through eight unit delayers 8UD.

Figure 6:
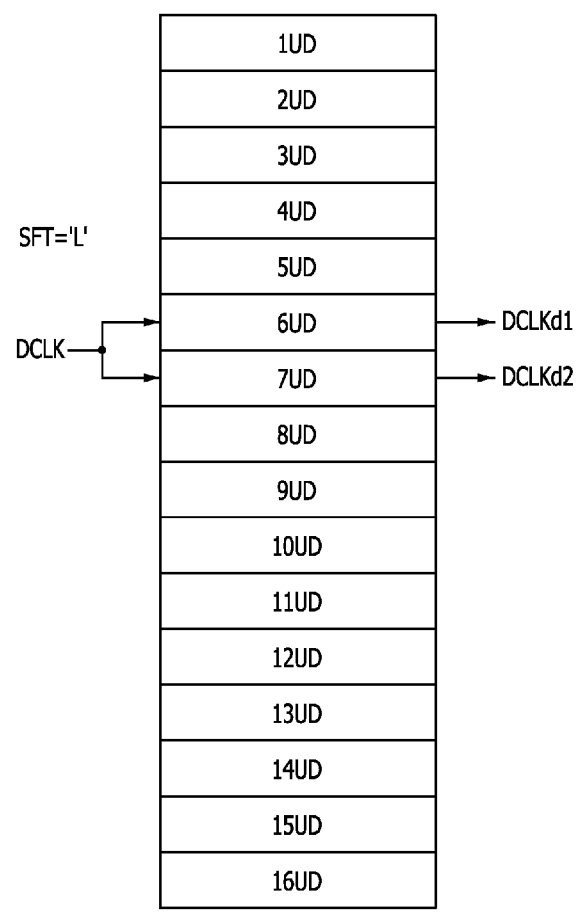

As illustrated in FIGS. 5 and 6, in the state in which the initial delay interval of the first sub-delay interval has been set as seven times the unit delay interval and the initial delay interval of the second sub-delay interval has been set as eight times the unit delay interval, when the delay control signal SFT having a logic low level "L" is generated in order to decrease the clock delay interval, the first delay division clock generation circuit 131_1A may generate the first delay division clock DCLKd1 by delaying the division clock DCLK through six unit delayers 6UD, and the second delay division clock generation circuit 131_2A may generate the second delay division clock DCLKd2 by delaying the division clock DCLK through seven unit delayers 7UD.

Figure 7:
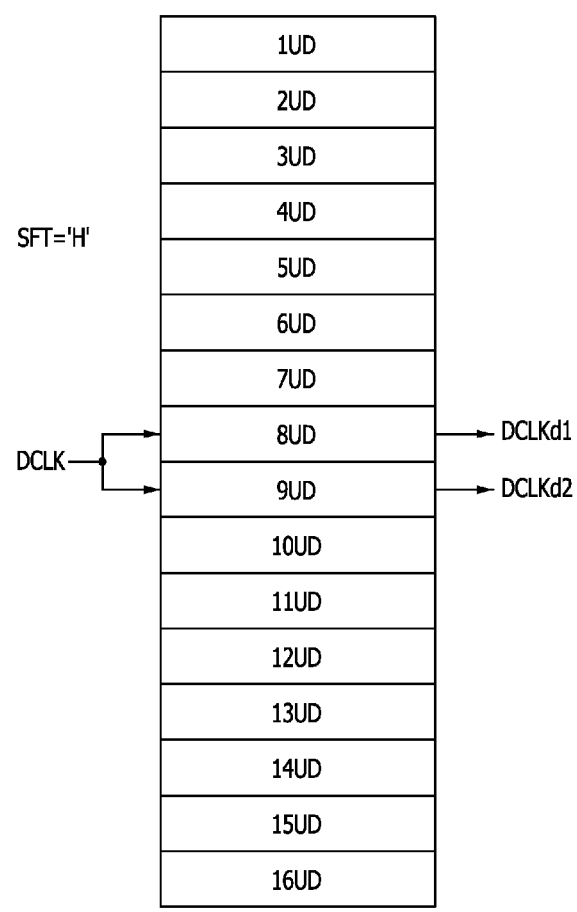

As illustrated in FIGS. 5 and 7, in the state in which the initial delay interval of the first sub-delay interval has been set as seven times the unit delay interval and the initial delay interval of the second sub-delay interval has been set as eight times the unit delay interval, when the delay control signal SFT having a logic high level "H" is generated in order to increase the clock delay interval, the first delay division clock generation circuit 131_1A may generate the first delay division clock DCLKd1 by delaying the division clock DCLK through eight unit delayers 8UD, and the second delay division clock generation circuit 131_2A may generate the second delay division clock DCLKd2 by delaying the division clock DCLK through nine unit delayers 9UD.

Figure 8:
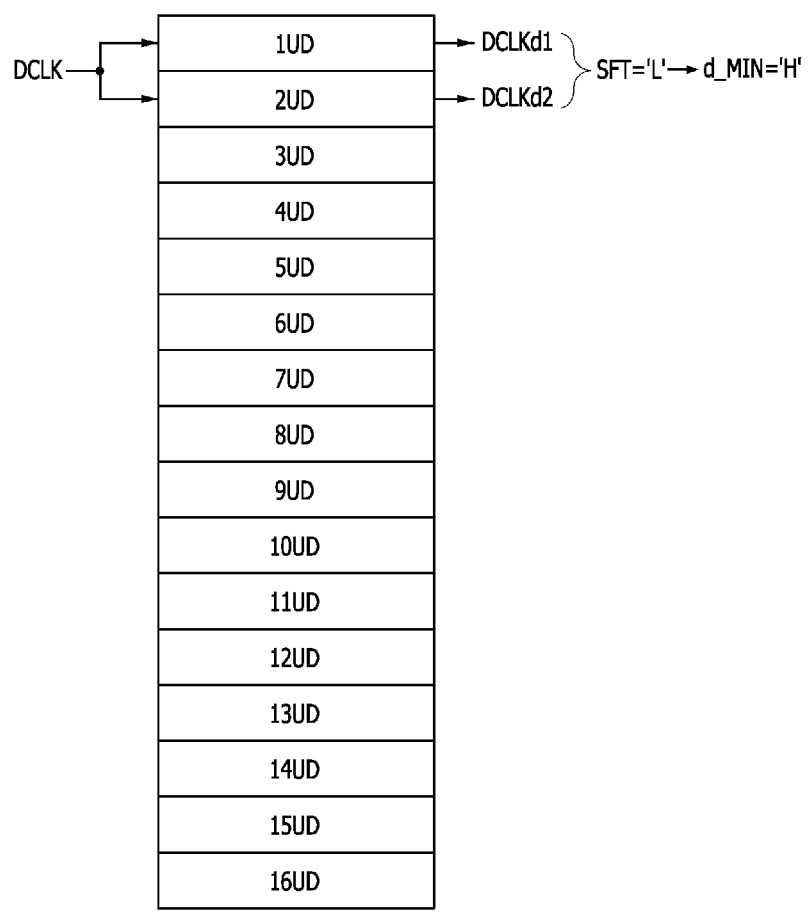

As illustrated in FIG. 8, in the state in which the first sub-delay interval has been set as one times the unit delay interval and the second sub-delay interval has been set as two times the unit delay interval, when the delay control signal SFT having a logic low level "L" is generated in order to decrease the clock delay interval, the first delay division clock generation circuit 131_1A may generate the minimum limit excess signal d_MIN that is activated to a logic high level "H" because the first sub-delay interval can be no longer decreased.

Figure 9:
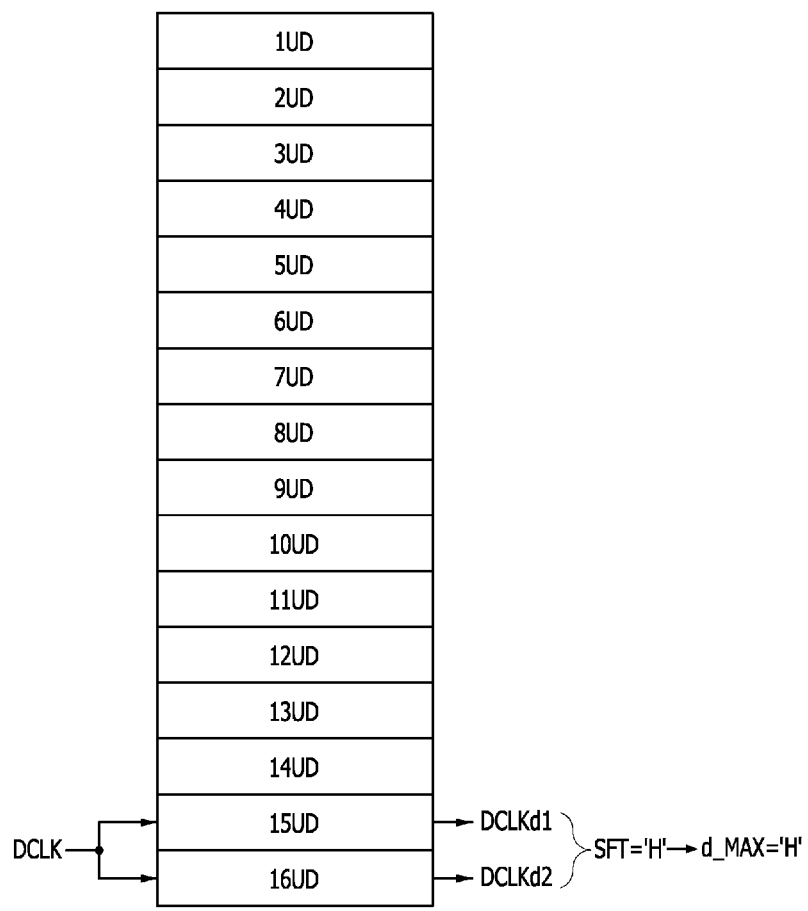

As illustrated in FIG. 9, in the state in which the first sub-delay interval has been set as 15 times the unit delay interval and the second sub-delay interval has been set as 16 times the unit delay interval, when the delay control signal SFT having a logic high level "H" is generated in order to increase the clock delay interval, the second delay division clock generation circuit 131_2A may generate the maximum limit excess signal d_MAX that is activated to a logic high level "H" because the first sub-delay interval can be no longer increased.

Figure 10:
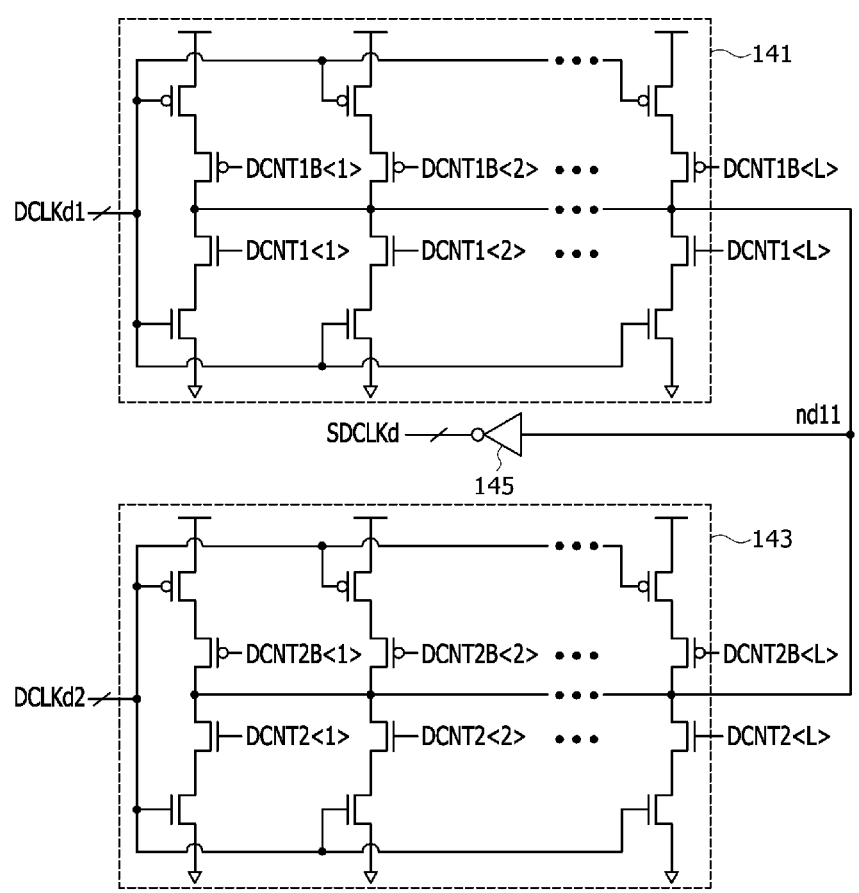
FIG. 10 is a circuit diagram of a delay division clock driving circuit according to an example of the present disclosure.

FIG. 10 is a circuit diagram of a delay division clock driving circuit 133A according to an example of the delay division clock driving circuit 133. As illustrated in FIG. 10, the delay division clock driving circuit 133A may include a first clock driving circuit 141, a second clock driving circuit 143, and an output buffer 145.

The first clock driving circuit 141 may receive the first delay division clock DCLKd1, and may drive a node nd11 by first driving power that is set by a first driving control signal DCNT1<1: L> and a first inverted driving control signal DCNT1B<1: L>. The first inverted driving control signals DCNT1B<1: L> may be generated by being inverted from the first driving control signal DCNT1<1: L>. The first driving power of the first clock driving circuit 141 may be adjusted based on logic bit sets of the first driving control signal DCNT1<1: L> and the first inverted driving control signal DCNT1B<1: L>. The first driving power of the first clock driving circuit 141 may be set to be great as the number of logic high levels that are included in the logic bit set of the first driving control signal DCNT1<1: L> and the number of logic high levels that are included in the logic bit set of the first inverted driving control signal DCNT1B<1: L> are increased.

The second clock driving circuit 143 may receive the second delay division clock DCLKd2, and may drive the node nd11 by second driving power that is set by a second driving control signal DCNT2<1: L> and a second inverted driving control signal DCNT2B<1: L>. The second inverted driving control signal DCNT2B<1: L> may be generated by being inverted from the second driving control signal DCNT2<1: L>. The second driving power of the second clock driving circuit 143 may be adjusted based on the logic bit sets of the second driving control signal DCNT2<1: L> and the second inverted driving control signal DCNT2B<1: L>. The second driving power of the second clock driving circuit 143 may be set to be great as the number of logic high levels that are included in the logic bit set of the second driving control signal DCNT2<1: L> and the number of logic high levels that are included in the logic bit set of the second inverted driving control signal DCNT2B<1: L> are increased.

The output buffer 145 may generate the selection delay division clock SDCLKd by inverting and buffering the signal of the node nd11. Level transition timing of the selection delay division clock SDCLKd may be generated more similarly to level transition timing of the first delay division clock DCLKd1 than to level transition timing of the second delay division clock DCLKd2 as the first driving power of the first clock driving circuit 141 is set to be greater and the second driving power of the second clock driving circuit 143 is set to be smaller. Furthermore, the level transition timing of the selection delay division clock SDCLKd may be generated more similarly to the level transition timing of the second delay division clock DCLKd2 than to the level transition timing of the first delay division clock DCLKd1 as the second driving power of the second clock driving circuit 143 is set to be greater and the first driving power of the first clock driving circuit 141 is set to be smaller.

The clock delay circuit 119 may generate the selection delay division clock SDCLKd by delaying the division clock DCLK by a clock delay interval that has been set between the first sub-delay interval and the second sub-delay interval. In this case, the clock delay interval may be set similarly to the first sub-delay interval as the first driving power of the first clock driving circuit 141 is set to be greater and the second driving power of the second clock driving circuit 143 is set to be smaller. Furthermore, the clock delay interval may be set similarly to the second sub-delay interval as the second driving power of the second clock driving circuit 143 is set to be greater and the first driving power of the first clock driving circuit 141 is set to be smaller.

Figure 11:
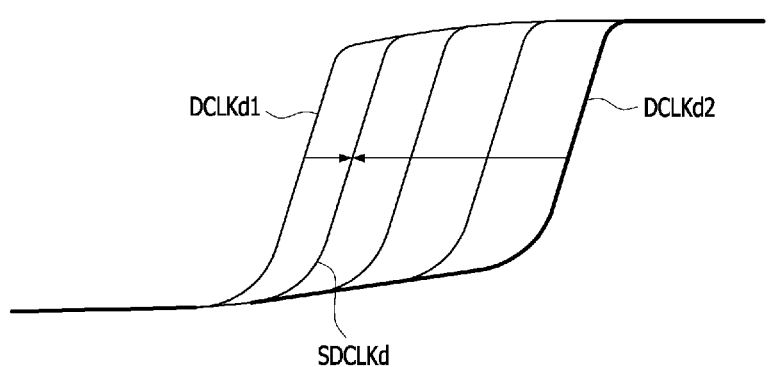
FIGS. 11 to 13 are waveforms for describing an operation of the delay division clock driving circuit according to an example of the present disclosure.
Figure 12:
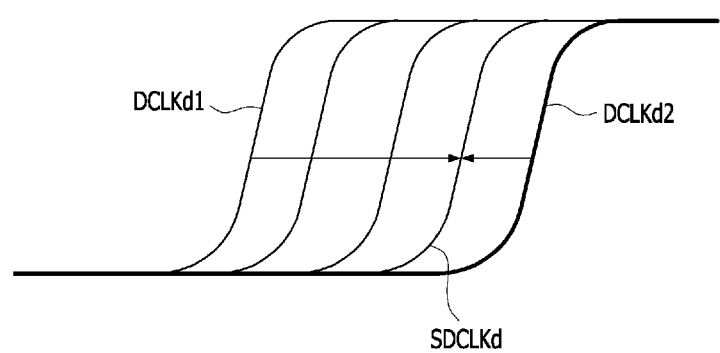
Figure 13:
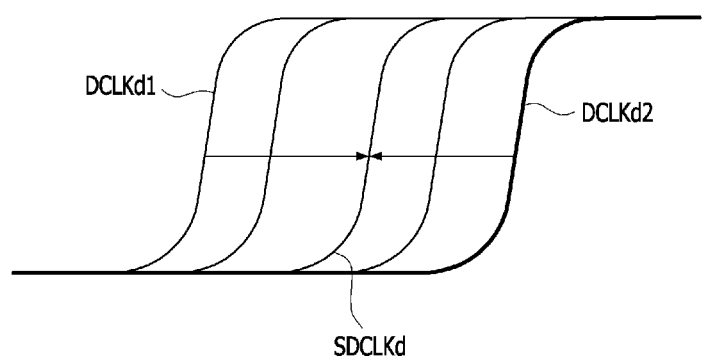

FIGS. 11 to 13 are waveforms for describing an operation of the delay division clock driving circuit 133A.

As illustrated in FIG. 11, as the first driving power of the first clock driving circuit 141 is set to be greater and the second driving power of the second clock driving circuit 143 is set to be smaller, the level transition timing of the selection delay division clock SDCLKd may be generated similarly to the level transition timing of the first delay division clock DCLKd1 than to the level transition timing of the second delay division clock DCLKd2. Accordingly, the clock delay interval of the clock delay circuit 119 in which the division clock DCLK is delayed may be set similarly to the first sub-delay interval.

As illustrated in FIG. 12, as the second driving power of the second clock driving circuit 143 is set to be greater and the first driving power of the first clock driving circuit 141 is set to be smaller, the level transition timing of the selection delay division clock SDCLKd may be generated similarly to the level transition timing of the second delay division clock DCLKd2 than to the level transition timing of the first delay division clock DCLKd1. Accordingly, the clock delay interval of the clock delay circuit 119, which delays the division clock DCLK, may be set similarly to the second sub-delay interval.

As illustrated in FIG. 13, when the first driving power of the first clock driving circuit 141 and the second driving power of the second clock driving circuit 143 are identically set, the level transition timing of the selection delay division clock SDCLKd may be set in the middle of the level transition timing of the first delay division clock DCLKd1 and the level transition timing of the second delay division clock DCLKd2. Accordingly, the clock delay interval of the clock delay circuit 119, which delays the division clock DCLK, may be set as a middle interval between the first sub-delay interval and the second sub-delay interval.

Figure 14:
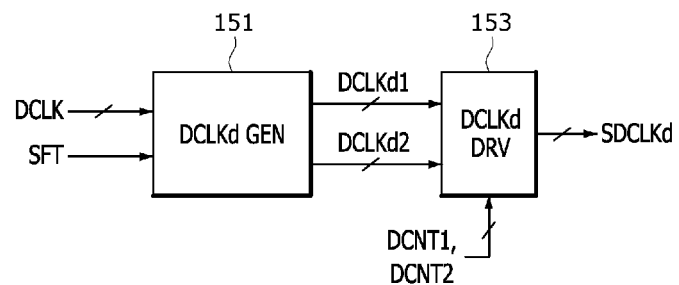
FIG. 14 is a block diagram illustrating a construction of a clock delay circuit according to another example of the present disclosure.

FIG. 14 is a block diagram illustrating a construction of a clock delay circuit 119B according to another example of the clock delay circuit 119. As illustrated in FIG. 14, the clock delay circuit 119B may include a delay division clock generation circuit (DCLKd GEN) 151 and a delay division clock driving circuit (DCLKd DRV) 153.

The delay division clock generation circuit 151 may generate the first delay division clock DCLKd1 by delaying the division clock DCLK by a first sub-delay interval and generate the second delay division clock DCLKd2 by delaying the division clock DCLK by a second sub-delay interval based on the delay control signal SFT. The delay division clock generation circuit 151 may include unit delayers each having a unit delay interval, and may generate the first delay division clock DCLKd1 by delaying the division clock DCLK by the first sub-delay interval and generate the second delay division clock DCLKd2 by delaying the division clock DCLK by the second sub-delay interval. The first sub-delay interval and the second sub-delay interval may each be set as an initial delay interval, and may be adjusted based on the delay control signal SFT. For example, when the delay control signal SFT for increasing the clock delay interval is generated in the state in which the initial delay interval of the first sub-delay interval has been set as seven times the unit delay interval and the initial delay interval of the second sub-delay interval has been set as eight times the unit delay interval, the delay division clock generation circuit 151 may generate the first delay division clock DCLKd1 by delaying the division clock DCLK by the first sub-delay interval that has been adjusted to be eight times the unit delay interval, and may generate the second delay division clock DCLKd2 by delaying the division clock DCLK by the second sub-delay interval that has been adjusted to be nine times the unit delay interval. As another example, when the delay control signal SFT for decreasing the clock delay interval is generated in the state in which the initial delay interval of the first sub-delay interval has been set as seven times the unit delay interval and the initial delay interval of the second sub-delay interval has been set as eight times the unit delay interval, the delay division clock generation circuit 151 may generate the first delay division clock DCLKd1 by delaying the division clock DCLK by the first sub-delay interval that has been adjusted to be six times the unit delay interval, and may generate the second delay division clock DCLKd2 by delaying the division clock DCLK by the second sub-delay interval that has been adjusted to be seven times the unit delay interval.

The delay division clock driving circuit 153 may be connected to the delay division clock generation circuit 151, and may receive the first delay division clock DCLKd1 and the second delay division clock DCLKd2 from the delay division clock generation circuit 151. The delay division clock driving circuit 153 may receive the first delay division clock DCLKd1, and may drive the selection delay division clock SDCLKd by first driving power that is set by the first driving control signal DCNT1. The delay division clock driving circuit 133 may receive the second delay division clock DCLKd2, and may drive the selection delay division clock SDCLKd by second driving power that is set by the second driving control signal DCNT2.

Figure 15:
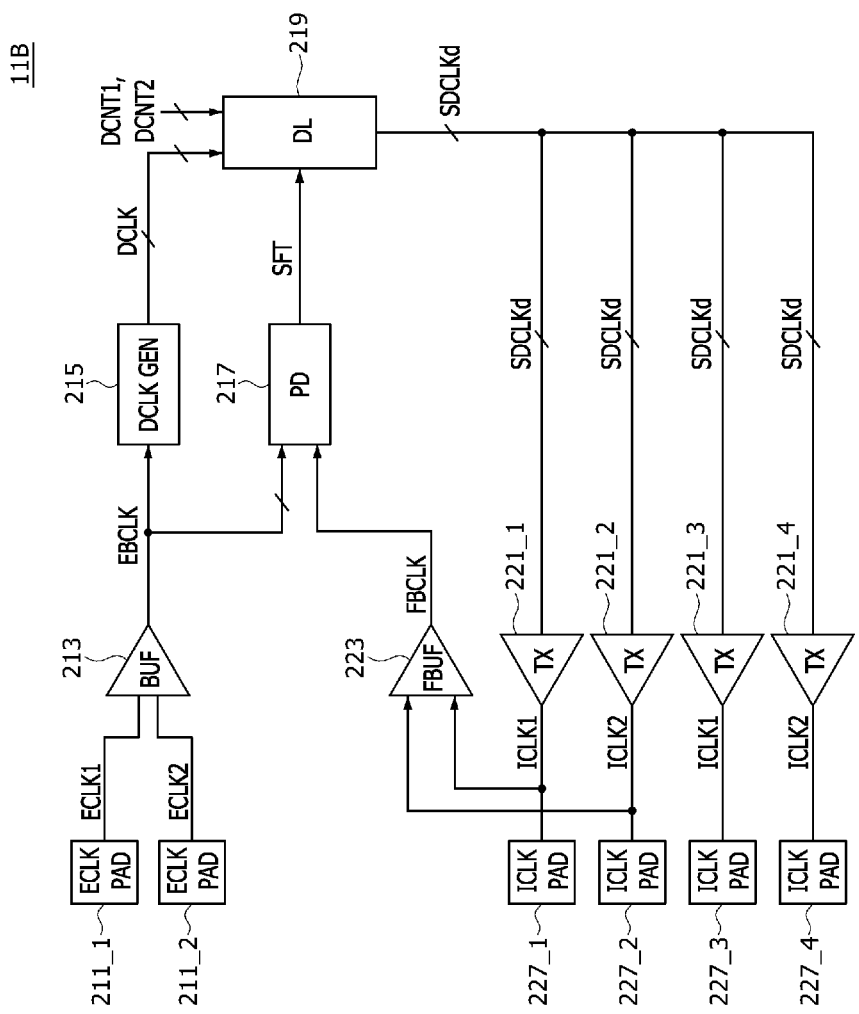
FIG. 15 is a block diagram illustrating a construction of a clock driver according to another example of the present disclosure.

FIG. 15 is a block diagram illustrating a construction of a clock driver 11B according to another example of the clock driver 11. As illustrated in FIG. 15, the clock driver 11B may include external clock pads (ECLK PAD) 211_1 and 211_2, a clock buffer (BUF) 213, a division clock generation circuit (DCLK GEN) 215, a phase detection circuit (PD) 217, a clock delay circuit (DL) 219, clock transmission circuits (TX) 221_1 to 221_4, a feedback buffer (FBUF) 223, and internal clock pads (ICLK PAD) 227_1 to 227_4.

The clock driver 11B may receive a first external clock ECLK1 and a second external clock ECLK2 that are applied by the memory controller (61 in FIG. 19), through the external clock pads 211_1 and 211_2. The first external clock ECLK1 may be received through the external clock pad 211_1. The second external clock ECLK2 may be received through the external clock pad 211_2.

The clock buffer 213 may be connected to the external clock pads 211_1 and 211_2, and may receive the first external clock ECLK1 and the second external clock ECLK2 from the external clock pads 211_1 and 211_2. The clock buffer 213 may generate an external buffer clock EBCLK based on the first external clock ECLK1 and the second external clock ECLK2.

The division clock generation circuit 215 may be connected to the clock buffer 213, and may receive the external buffer clock EBCLK from the clock buffer 213. The division clock generation circuit 215 may generate the division clock DCLK based on the external buffer clock EBCLK.

The phase detection circuit 217 may be connected to the clock buffer 213 and the feedback buffer 223, and may receive the external buffer clock EBCLK from the clock buffer 213 and receive a feedback buffer clock FBCLK from the feedback buffer 223. The phase detection circuit 217 may generate a delay control signal SFT based on the external buffer clock EBCLK and the feedback buffer clock FBCLK. The phase detection circuit 217 may generate the delay control signal SFT for adjusting the clock delay interval of the clock delay circuit 219 by comparing the phases of the external buffer clock EBCLK and the feedback buffer clock FBCLK.

The clock delay circuit 219 may be connected to the phase detection circuit 217, and may receive the delay control signal SFT from the phase detection circuit 217. The clock delay circuit 219 may generate a selection delay division clock SDCLKd by delaying the division clock DCLK by the clock delay interval that is set based on the delay control signal SFT and a driving control signal DCNT1 and DCNT2.

The first clock transmission circuit 221_1, the second clock transmission circuit 221_2, the third clock transmission circuit 221_3, and the fourth clock transmission circuit 221_4 may be connected to the clock delay circuit 219, and may receive the selection delay division clock SDCLKd from the clock delay circuit 219. The first clock transmission circuit 221_1, the second clock transmission circuit 221_2, the third clock transmission circuit 221_3, and the fourth clock transmission circuit 221_4 may generate a first internal clock ICLK1 and a second internal clock ICLK2 based on the selection delay division clock SDCLKd. The first clock transmission circuit 221_1 may generate the first internal clock ICLK1 having the same phase as the selection delay division clock SDCLKd, and may output the first internal clock ICLK1 to the first internal clock pad 227_1. The second clock transmission circuit 221_2 may generate the second internal clock ICLK2 having a phase opposite to the phase of the selection delay division clock SDCLKd, and may output the second internal clock ICLK2 to the second internal clock pad 227_2. The third clock transmission circuit 221_3 may generate the first internal clock ICLK1 having the same phase as the selection delay division clock SDCLKd, and may output the first internal clock ICLK1 to the third internal clock pad 227_3. The fourth clock transmission circuit 221_4 may generate the second internal clock ICLK2 having a phase opposite to the phase of the selection delay division clock SDCLKd, and may output the second internal clock ICLK2 to the fourth internal clock pad 227_4. According to an embodiment, the first clock transmission circuit 221_1 and the third clock transmission circuit 221_3 may each be implemented to generate the first internal clock ICLK1 that has been set to have the same frequency as each of the first external clock ECLK1 and the second external clock ECLK2, based on the selection delay division clock SDCLKd. According to an embodiment, the second clock transmission circuit 221_2 and the fourth clock transmission circuit 221_4 may each be implemented to generate the second internal clock ICLK2 that has been set to have the same frequency as each of the first external clock ECLK1 and the second external clock ECLK2, based on the selection delay division clock SDCLKd.

The feedback buffer 223 may be connected to the first clock transmission circuit 221_1 and the second clock transmission circuit 221_2, and may receive the first internal clock ICLK1 from the first clock transmission circuit 221_1 and receive the second internal clock ICLK2 from the second clock transmission circuit 221_2. The feedback buffer 223 may generate the feedback buffer clock FBCLK based on the first internal clock ICLK1 and the second internal clock ICLK2. The feedback buffer 223 may be implemented identically with the clock buffer 213.

Figure 16:
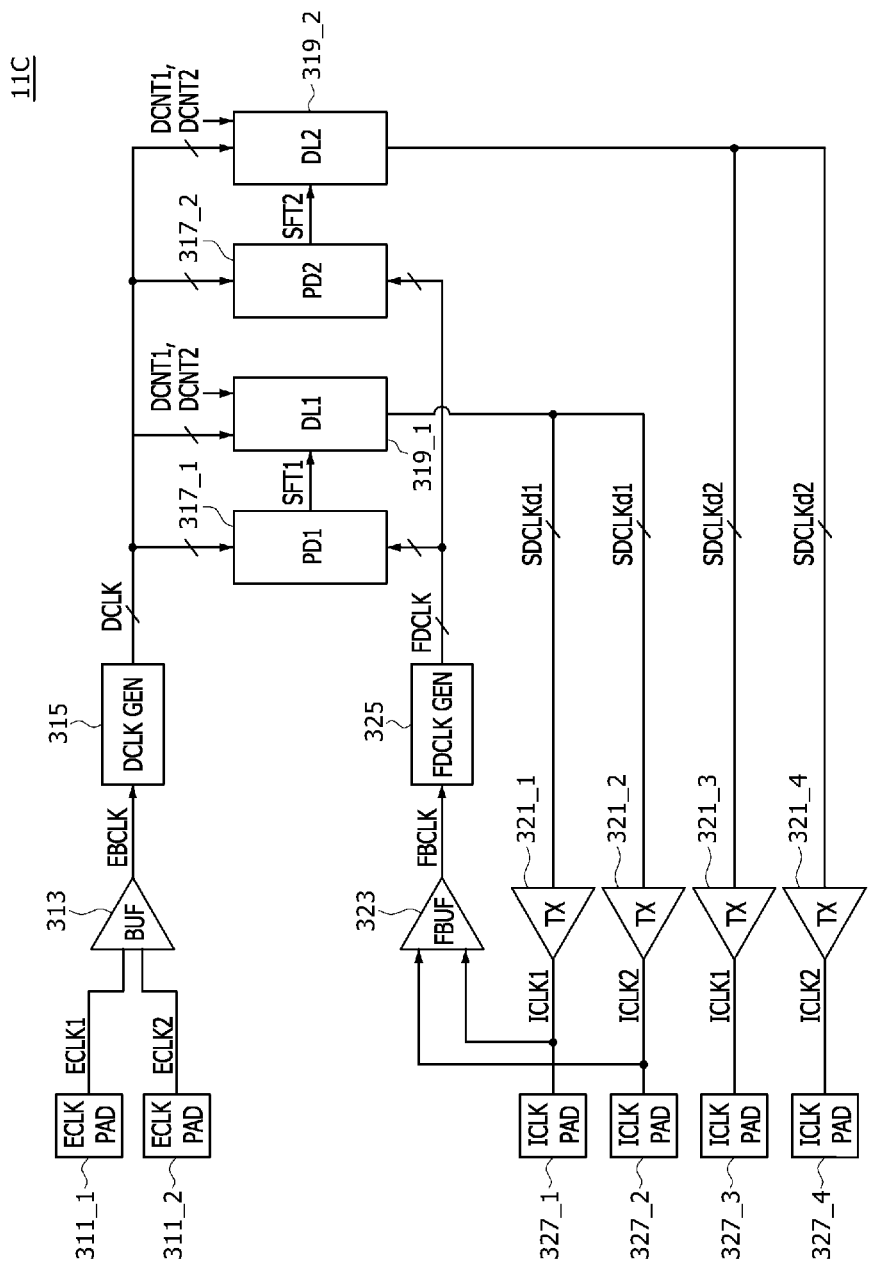
FIG. 16 is a block diagram illustrating a construction of a clock driver according to still another example of the present disclosure.

FIG. 16 is a block diagram illustrating a construction of a clock driver 11C according to still another example of the clock driver 11. As illustrated in FIG. 16, the clock driver 31C may include external clock pads (ECLK PAD) 311_1 and 311_2, a clock buffer (BUF) 313, a division clock generation circuit (DCLK GEN) 315, a first phase detection circuit (PD1) 317_1, a first clock delay circuit (DL1) 319_1, a second phase detection circuit (PD2) 317_2, a second clock delay circuit (DL2) 319_2, clock transmission circuits (TX) 321_1 to 321_4, a feedback buffer (FBUF) 323, a feedback division clock generation circuit (FDCLK GEN) 325, and internal clock pads (ICLK PAD) 327_1 to 327_4.

The clock driver 11C may receive a first external clock ECLK1 and a second external clock ECLK2 that are applied by the memory controller (61 in FIG. 19), through the external clock pads 311_1 and 311_2. The first external clock ECLK1 may be received through the external clock pad 311_1. The second external clock ECLK2 may be received through the external clock pad 311_2.

The clock buffer 313 may be connected to the external clock pads 311_1 and 311_2, and may receive the first external clock ECLK1 and the second external clock ECLK2 from the external clock pads 311_1 and 311_2. The clock buffer 313 may generate an external buffer clock EBCLK based on the first external clock ECLK1 and the second external clock ECLK2.

The division clock generation circuit 315 may be connected to the clock buffer 313, and may receive the external buffer clock EBCLK from the clock buffer 313. The division clock generation circuit 315 may generate a division clock DCLK based on the external buffer clock EBCLK.

The first phase detection circuit 317_1 may be connected to the division clock generation circuit 315 and the feedback division clock generation circuit 325, and may receive the division clock DCLK from the division clock generation circuit 315 and receive a feedback division clock FDCLK from the feedback division clock generation circuit 325. The first phase detection circuit 317_1 may generate a first delay control signal SFT1 based on the division clock DCLK and the feedback division clock FDCLK. The first phase detection circuit 317_1 may generate the first delay control signal SFT1 for adjusting the clock delay interval of the first clock delay circuit 319_1 by comparing the phases of the division clock DCLK and the feedback division clock FDCLK.

The first clock delay circuit 319_1 may be connected to the first phase detection circuit 317_1, and may receive the first delay control signal SFT1 from the first phase detection circuit 317_1. The clock delay circuit 319_1 may generate a first selection delay division clock SDCLKd1 by delaying the division clock DCLK by a first clock delay interval that is set based on the first delay control signal SFT1 and a driving control signal DCNT1 and DCNT2.

The second phase detection circuit 317_2 may be connected to the division clock generation circuit 315 and the feedback division clock generation circuit 325, and may receive the division clock DCLK from the division clock generation circuit 315 and receive the feedback division clock FDCLK from the feedback division clock generation circuit 325. The second phase detection circuit 317_2 may generate a second delay control signal SFT2 based on the division clock DCLK and the feedback division clock FDCLK. The second phase detection circuit 317_2 may generate the second delay control signal SFT2 for adjusting the clock delay interval of the second clock delay circuit 319_2 by comparing the phases of the division clock DCLK and the feedback division clock FDCLK.

The second clock delay circuit 319_2 may be connected to the second phase detection circuit 317_2, and may receive the second delay control signal SFT2 from the second phase detection circuit 317_2. The clock delay circuit 319 may generate a second selection delay division clock SDCLKd2 by delaying the division clock DCLK by a second clock delay interval that is set based on the second delay control signal SFT2 and the driving control signal DCNT1 and DCNT2.

The first clock transmission circuit 321_1 and the second clock transmission circuit 321_2 may be connected to the first clock delay circuit 319_1, and may receive the first selection delay division clock SDCLKd1 from the first clock delay circuit 319_1. The first clock transmission circuit 321_1 and the second clock transmission circuit 321_2 may generate a first internal clock ICLK1 and a second internal clock ICLK2 based on a first selection delay division clock SDCLKd1. The first clock transmission circuit 321_1 may generate the first internal clock ICLK1 having the same phase as the first selection delay division clock SDCLKd1, and may output the first internal clock ICLK1 to the first internal clock pad 327_1. The second clock transmission circuit 321_2 may generate the second internal clock ICLK2 having a phase opposite to the phase of the first selection delay division clock SDCLKd1, and may output the second internal clock ICLK2 to the second internal clock pad 327_2. According to an embodiment, the first clock transmission circuit 321_1 may be implemented to generate the first internal clock ICLK1 that has been set to have the same frequency as each of the first external clock ECLK1 and the second external clock ECLK2, based on the first selection delay division clock SDCLKd1. According to an embodiment, the second clock transmission circuit 321_2 may be implemented to generate the second internal clock ICLK2 that has been set to have the same frequency as each of the first external clock ECLK1 and the second external clock ECLK2, based on the first selection delay division clock SDCLKd1.

The third clock transmission circuit 321_3 and the fourth clock transmission circuit 321_4 may be connected to the second clock delay circuit 319_2, and may receive the second selection delay division clock SDCLKd2 from the second clock delay circuit 319_2. The third clock transmission circuit 321_3 and the fourth clock transmission circuit 321_4 may generate the first internal clock ICLK1 and the second internal clock ICLK2 based on the second selection delay division clock SDCLKd2. The third clock transmission circuit 321_3 may generate the first internal clock ICLK1 having the same phase as the second selection delay division clock SDCLKd2, and may output the first internal clock ICLK1 to the third internal clock pad 327_3. The fourth clock transmission circuit 321_4 may generate the second internal clock ICLK2 having a phase opposite to the phase of the second selection delay division clock SDCLKd2, and may output the second internal clock ICLK2 to the fourth internal clock pad 327_4. According to an embodiment, the third clock transmission circuit 321_3 may be implemented to generate the first internal clock ICLK1 that has been set to have the same frequency as each of the first external clock ECLK1 and the second external clock ECLK2, based on the second selection delay division clock SDCLKd2. According to an embodiment, the fourth clock transmission circuit 321_4 may be implemented to generate the second internal clock ICLK2 that has been set to have the same frequency as each of the first external clock ECLK1 and the second external clock ECLK2, based on the second selection delay division clock SDCLKd2.

The feedback buffer 323 may be connected to the first clock transmission circuit 321_1 and the second clock transmission circuit 321_2, and may receive the first internal clock ICLK1 from the first clock transmission circuit 321_1 and receive the second internal clock ICLK2 from the second clock transmission circuit 321_2. The feedback buffer 323 may generate a feedback buffer clock FBCLK based on the first internal clock ICLK1 and the second internal clock ICLK2.

The feedback division clock generation circuit 325 may be connected to the feedback buffer 323, and may receive the feedback buffer clock FBCLK from the feedback buffer 323. The feedback division clock generation circuit 325 may generate the feedback division clock FDCLK based on the feedback buffer clock FBCLK.

Figure 17:
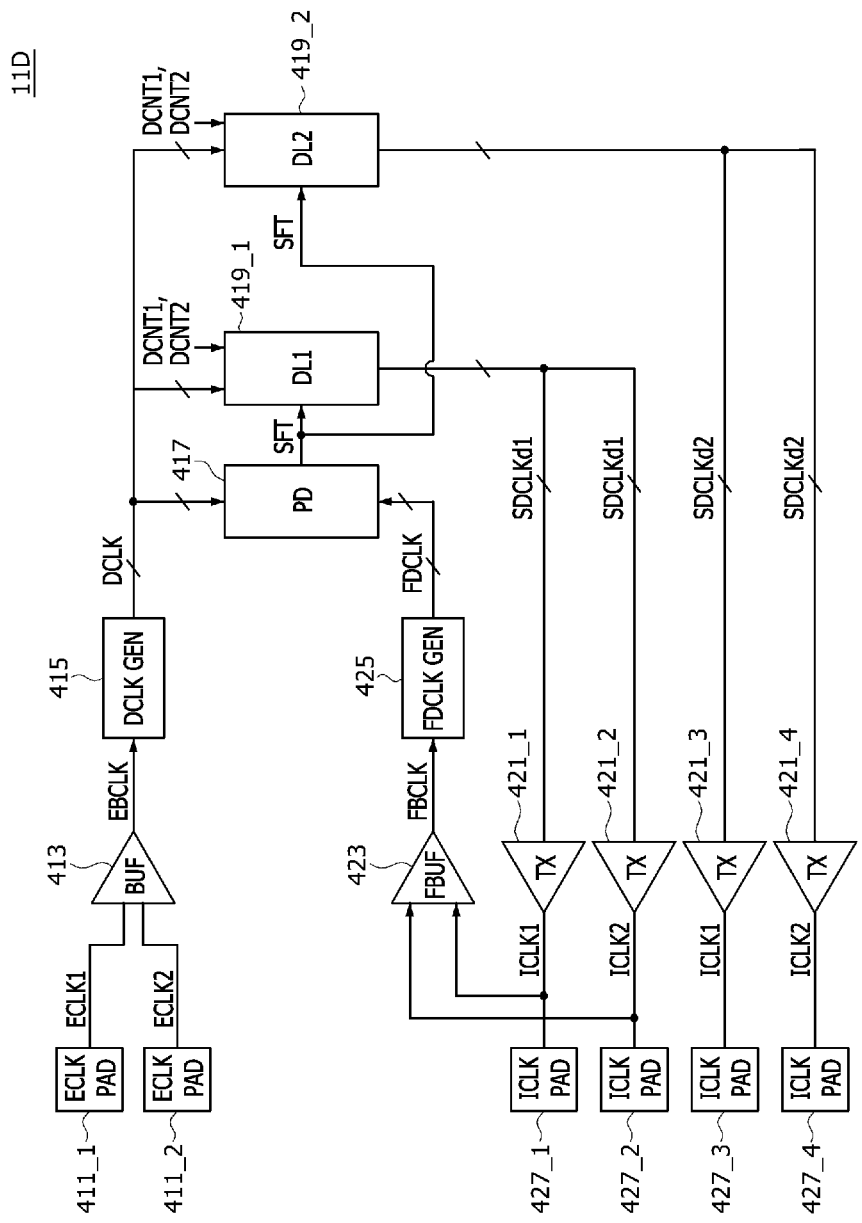
FIG. 17 is a block diagram illustrating a construction of a clock driver according to still another example of the present disclosure.

FIG. 17 is a block diagram illustrating a construction of a clock driver 11D according to still another example of the clock driver 11. As illustrated in FIG. 17, the clock driver 11D may include external clock pads (ECLK PAD) 411_1 and 411_2, a clock buffer (BUF) 413, a division clock generation circuit (DCLK GEN) 415, a phase detection circuit (PD) 417_1, a first clock delay circuit (DL1) 419_1, a second clock delay circuit (DL2) 419_2, clock transmission circuits (TX) 421_1 to 421_4, a feedback buffer (FBUF) 423, a feedback division clock generation circuit (FDCLK GEN) 425, and internal clock pads (ICLK PAD) 427_1 to 427_4.

The clock driver 11D may receive a first external clock ECLK1 and a second external clock ECLK2 that are applied by the memory controller (61 in FIG. 19), through the external clock pads 411_1 and 411_2. The first external clock ECLK1 may be received through the external clock pad 411_1. The second external clock ECLK2 may be received through the external clock pad 411_2.

The clock buffer 413 may be connected to the external clock pads 411_1 and 411_2, and may receive the first external clock ECLK1 and the second external clock ECLK2 from the external clock pads 411_1 and 411_2. The clock buffer 413 may generate an external buffer clock EBCLK based on the first external clock ECLK1 and the second external clock ECLK2.

The division clock generation circuit 415 may be connected to the clock buffer 413, and may receive the external buffer clock EBCLK from the clock buffer 413. The division clock generation circuit 415 may generate a division clock DCLK based on the external buffer clock EBCLK.

The phase detection circuit 417 may be connected to the division clock generation circuit 415 and the feedback division clock generation circuit 425, and may receive the division clock DCLK from the division clock generation circuit 415 and receive a feedback division clock FDCLK from the feedback division clock generation circuit 425. The phase detection circuit 417 may generate a delay control signal SFT based on the division clock DCLK and the feedback division clock FDCLK. The phase detection circuit 417 may generate the delay control signal SFT for adjusting the clock delay interval of the first clock delay circuit 419_1 by comparing the phases of the division clock DCLK and the feedback division clock FDCLK.

The first clock delay circuit 419_1 may be connected to the phase detection circuit 417, and may receive the delay control signal SFT from the phase detection circuit 417. The clock delay circuit 419 may generate a first selection delay division clock SDCLKd1 by delaying the division clock DCLK by a first clock delay interval that is set based on the delay control signal SFT and a driving control signal DCNT1 and DCNT2.

The second clock delay circuit 419_2 may be connected to the phase detection circuit 417, and may receive the delay control signal SFT from the phase detection circuit 417. The clock delay circuit 419 may generate a second selection delay division clock SDCLKd2 by delaying the division clock DCLK by a second clock delay interval that is set based on the delay control signal SFT and the driving control signal DCNT1 and DCNT2.

The first clock transmission circuit 421_1 and the second clock transmission circuit 421_2 may be connected to the first clock delay circuit 419_1, and may receive the first selection delay division clock SDCLKd1 from the first clock delay circuit 419_1. The first clock transmission circuit 421_1 and the second clock transmission circuit 421_2 may generate a first internal clock ICLK1 and a second internal clock ICLK2 based on the first selection delay division clock SDCLKd1. The first clock transmission circuit 421_1 may generate the first internal clock ICLK1 having the same phase as the first selection delay division clock SDCLKd1, and may output the first internal clock ICLK1 to the first internal clock pad 427_1. The second clock transmission circuit 421_2 may generate the second internal clock ICLK2 having a phase opposite to the phase of the first selection delay division clock SDCLKd1, and may output the second internal clock ICLK2 to the second internal clock pad 427_2. According to an embodiment, the first clock transmission circuit 421_1 may be implemented to generate the first internal clock ICLK1 that has been set to have the same frequency as each of the first external clock ECLK1 and the second external clock ECLK2, based on the first selection delay division clock SDCLKd1. According to an embodiment, the second clock transmission circuit 421_2 may be implemented to generate the second internal clock ICLK2 that has been set to have the same frequency as each of the first external clock ECLK1 and the second external clock ECLK2, based on the first selection delay division clock SDCLKd1.

The third clock transmission circuit 421_3 and the fourth clock transmission circuit 421_4 may be connected to the second clock delay circuit 419_2, and may receive the second selection delay division clock SDCLKd2 from the second clock delay circuit 419_2. The third clock transmission circuit 421_3 and the fourth clock transmission circuit 421_4 may generate the first internal clock ICLK1 and the second internal clock ICLK2 based on the second selection delay division clock SDCLKd2. The third clock transmission circuit 421_3 may generate the first internal clock ICLK1 having the same phase as the second selection delay division clock SDCLKd2, and may output the first internal clock ICLK1 to the third internal clock pad 427_3. The fourth clock transmission circuit 421_4 may generate the second internal clock ICLK2 having a phase opposite to the phase of the second selection delay division clock SDCLKd2, and may output the second internal clock ICLK2 to the fourth internal clock pad 427_4. According to an embodiment, the third clock transmission circuit 421_3 may be implemented to generate the first internal clock ICLK1 that has been set to have the same frequency as each of the first external clock ECLK1 and the second external clock ECLK2, based on the second selection delay division clock SDCLKd2. According to an embodiment, the fourth clock transmission circuit 421_4 may be implemented to generate the second internal clock ICLK2 that has been set to have the same frequency as each of the first external clock ECLK1 and the second external clock ECLK2, based on the second selection delay division clock SDCLKd2.

The feedback buffer 423 may be connected to the first clock transmission circuit 421_1 and the second clock transmission circuit 421_2, and may receive the first internal clock ICLK1 from the first clock transmission circuit 421_1 and receive the second internal clock ICLK2 from the second clock transmission circuit 421_2. The feedback buffer 423 may generate a feedback buffer clock FBCLK based on the first internal clock ICLK1 and the second internal clock ICLK2.

The feedback division clock generation circuit 425 may be connected to the feedback buffer 423, and may receive the feedback buffer clock FBCLK from the feedback buffer 423. The feedback division clock generation circuit 425 may generate the feedback division clock FDCLK based on the feedback buffer clock FBCLK.

Figure 18:
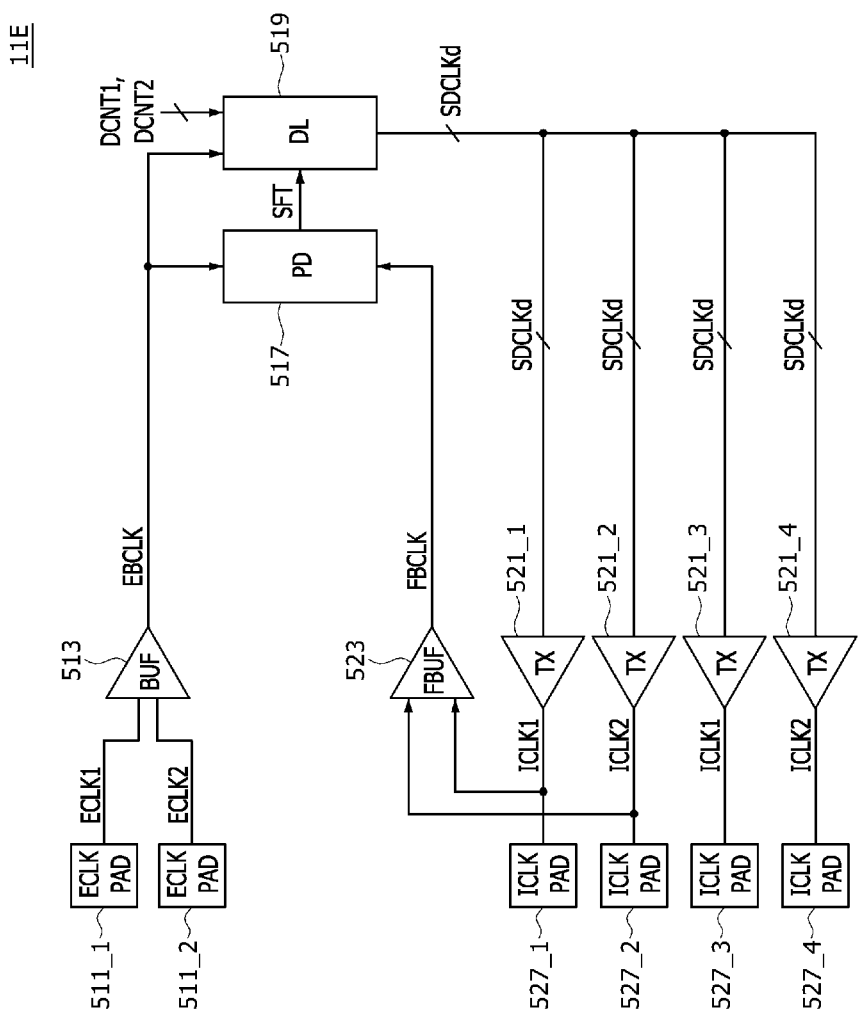
FIG. 18 is a block diagram illustrating a construction of a clock driver according to still another example of the present disclosure.

FIG. 18 is a block diagram illustrating a construction of a clock driver 11E according to an example of the clock driver 11. As illustrated in FIG. 18, the clock driver 11E may include external clock pads (ECLK PAD) 511_1 and 511_2, a clock buffer (BUF) 513, a phase detection circuit (PD) 517, a clock delay circuit (DL) 519, clock transmission circuits (TX) 521_1 to 521_4, a feedback buffer (FBUF) 523, and internal clock pads (ICLK PAD) 527_1 to 527_4.

The clock driver 11E may receive a first external clock ECLK1 and a second external clock ECLK2 that are applied by the memory controller (61 in FIG. 19), through external clock pads 511_1 and 511_2. The first external clock ECLK1 may be received through the external clock pad 511_1. The second external clock ECLK2 may be received through the external clock pad 511_2.

The clock buffer 513 may be connected to the external clock pads 511_1 and 511_2, and may receive the first external clock ECLK1 and the second external clock ECLK2 from the external clock pads 511_1 and 511_2. The clock buffer 513 may generate an external buffer clock EBCLK based on the first external clock ECLK1 and the second external clock ECLK2.

The phase detection circuit 517 may be connected to the clock buffer 513 and the feedback buffer 523, and may receive the external buffer clock EBCLK from the clock buffer 513 and receive a feedback buffer clock FBCLK from the feedback buffer 523. The phase detection circuit 517 may generate a delay control signal SFT based on the external buffer clock EBCLK and the feedback buffer clock FBCLK. The phase detection circuit 517 may generate the delay control signal SFT for adjusting the clock delay interval of the clock delay circuit 519 by comparing the phases of the external buffer clock EBCLK and the feedback buffer clock FBCLK.

The clock delay circuit 519 may be connected to the phase detection circuit 517, and may receive the delay control signal SFT from the phase detection circuit 517. The clock delay circuit 519 may generate a selection delay division clock SDCLKd by delaying the external buffer clock EBCLK by a clock delay interval that is set based on the delay control signal SFT and a driving control signal DCNT1 and DCNT2.

The first clock transmission circuit 521_1, the second clock transmission circuit 521_2, the third clock transmission circuit 521_3, and the fourth clock transmission circuit 521_4 may be connected to the clock delay circuit 519, and may receive the selection delay division clock SDCLKd from the clock delay circuit 519. The first clock transmission circuit 521_1, the second clock transmission circuit 521_2, the third clock transmission circuit 521_3, and the fourth clock transmission circuit 521_4 may generate an internal clock ICLK1 and ICLK2 based on the selection delay division clock SDCLKd. The first clock transmission circuit 521_1 may generate a first internal clock ICLK1 having the same phase as the selection delay division clock SDCLKd, and may output the first internal clock ICLK1 to the first internal clock pad 527_1. The second clock transmission circuit 521_2 may generate a second internal clock ICLK2 having a phase opposite to the phase of the selection delay division clock SDCLKd, and may output the second internal clock ICLK2 to the second internal clock pad 527_2. The third clock transmission circuit 521_3 may generate the first internal clock ICLK1 having the same phase as the selection delay division clock SDCLKd, and may output the first internal clock ICLK1 to the third internal clock pad 527_3. The fourth clock transmission circuit 521_4 may generate the second internal clock ICLK2 having a phase opposite to the phase of the selection delay division clock SDCLKd, and may output the second internal clock ICLK2 to the fourth internal clock pad 527_4. According to an embodiment, the first clock transmission circuit 521_1 and the third clock transmission circuit 521_3 may each be implemented to generate the first internal clock ICLK1 that has been set to have the same frequency as each of the first external clock ECLK1 and the second external clock ECLK2 based on the selection delay division clock SDCLKd. According to an embodiment, the second clock transmission circuit 521_2 and the fourth clock transmission circuit 521_4 may each be implemented to generate the second internal clock ICLK2 that has been set to have the same frequency as each of the first external clock ECLK1 and the second external clock ECLK2 based on the selection delay division clock SDCLKd.

The feedback buffer 523 may be connected to the first clock transmission circuit 521_1 and the second clock transmission circuit 521_2, and may receive the first internal clock ICLK1 from the first clock transmission circuit 521_1 and receive the second internal clock ICLK2 from the second clock transmission circuit 521_2. The feedback buffer 523 may generate the feedback buffer clock FBCLK based on the first internal clock ICLK1 and the second internal clock ICLK2.

Figure 19:
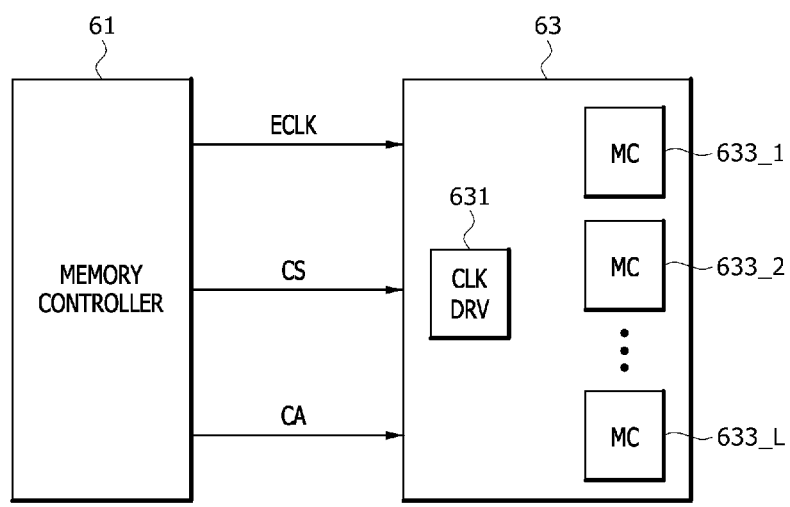
FIG. 19 is a block diagram illustrating a construction of a memory system according to an example of the present disclosure.

FIG. 19 is a block diagram illustrating a construction of a memory system 6 according to an example of the present disclosure. As illustrated in FIG. 19, the memory system 6 may include the memory controller 61 and a memory module 63.

The memory controller 61 may supply an external clock ECLK, a chip selection signal CS, and a command address CA to the memory module 63. The memory module 63 may be connected to the memory controller 61, and may receive the external clock ECLK, the chip selection signal CS, and the command address CA from the memory controller 61. The memory module 63 may include a clock driver (CLK DRV) 631 and memory chips (MC) 633_1 to 633_L. The clock driver 631 and the memory chips 633_1 to 633_L that are included in the memory module 63 may be implemented identically with the clock driver 11 and the memory chips 171_1 to 171_16 that are illustrated in FIG. 1, and thus detailed descriptions and operations of the clock driver 631 and the memory chips 633_1 to 633_L are omitted.

The memory module 1 described with reference to FIG. 1 and the memory system 6 described with reference to FIG. 19 may be applied to an electronic system including a memory system, a graphic system, a computing system, and a mobile system. For example, referring to FIG. 20, an electronic system 1000 according to an embodiment of the present disclosure may include a data storage unit 1001, a memory controller 1002, buffer memory 1003, and an input and output (I/O) interface 1004.

The data storage unit 1001 may store data (not illustrated) that is applied by the memory controller 1002, read the stored data (not illustrated), and output the read data to the memory controller 1002, based on a control signal from the memory controller 1002. The data storage unit 1001 may include nonvolatile memory capable of continuously storing data without losing the data although power is blocked. The nonvolatile memory may be implemented as flash memory (e.g., NOR flash memory or NAND flash memory), phase change random access memory (PRAM), resistive random access memory (RRAM), spin transfer torque random access memory (STTRAM), or magnetic random access memory (MRAM).

Figure 20:
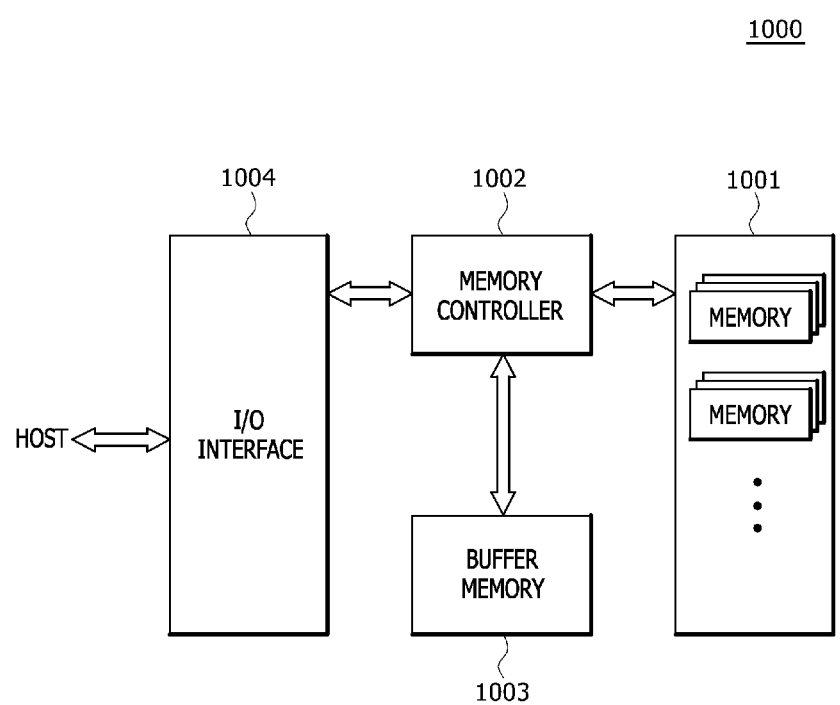
FIG. 20 is a block diagram illustrating a construction of an electronic system according to an example of the present disclosure.

The memory controller 1002 may decode an instruction that is applied by an external device (or a host device) through the I/O interface 1004, and may control the input and output of data to and from the data storage unit 1001 and the buffer memory 1003 based on the results of the decoding. In FIG. 20, the memory controller 1002 has been indicated as one block, but the memory controller 1002 may include a controller for controlling the data storage unit 1001 and a controller for controlling the buffer memory 1003 that is volatile memory, which are independently constructed. The memory controller 1002 may include the memory controller 61 described with reference to FIG. 19.

The buffer memory 1003 may store data to be processed by the memory controller 1002, that is, data (not illustrated) that are input to and output from the data storage unit 1001. The buffer memory 1003 may store data (not illustrated) that is applied by the memory controller 1002 based on a control signal from the memory controller 1002. The buffer memory 1003 may include the memory module 1 described with reference to FIG. 1 and the memory module 63 described with reference to FIG. 19. The buffer memory 1003 may read data that has been stored in the buffer memory 1003, and may output the read data to the memory controller 1002. The buffer memory 1003 may include volatile memory, such as dynamic random access memory (DRAM), mobile DRAM, and static random access memory (SRAM).

The I/O interface 1004 may provide a physical connection between the memory controller 1002 and an external device (or a host) so that the memory controller 1002 may receive a control signal for the input and output of data to and from the external device and may exchange data with the external device. The I/O interface 1004 may include one of various interface protocols, such as a USB, an MMC, PCI-E, an SAS, SATA, PATA, an SCSI, an ESDI, and IDE.

The electronic system 1000 may be used as an auxiliary memory device of a host device or external storage device. The electronic system 1000 may include a solid state disk (SSD), universal serial bus (USB) memory, a secure digital (SD) card, a mini secure digital (mSD) card, a micro SD card, a secure digital high capacity (SDHC) card, a memory stick card, a smart media (SM) card, a multi-media card (MMC), an embedded MMC (eMMC), and a compact flash (CF) card.

Figure 21:
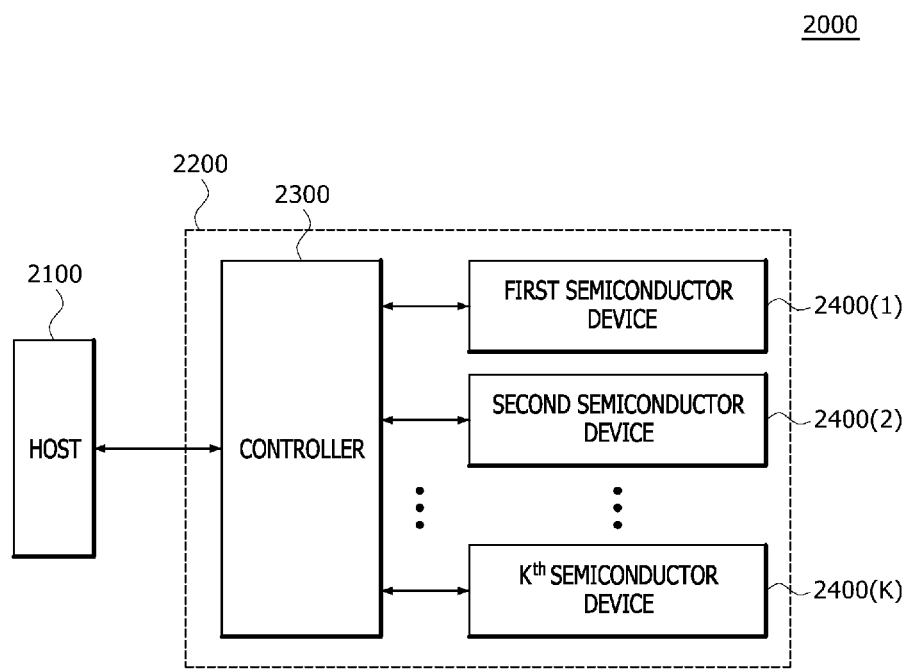
FIG. 21 is a block diagram illustrating a construction of an electronic system according to another example of the present disclosure.

FIG. 21 is a block diagram illustrating a construction of the electronic system 2000 according to another embodiment of the present disclosure. As illustrated in FIG. 21, the electronic system 2000 may include a host 2100 and a semiconductor system 2200.

The host 2100 and the semiconductor system 2200 may mutually transmit signals by using an interface protocol. The interface protocol that is used between the host 2100 and the semiconductor system 2200 may include a multi-media card (MMC), an enhanced small disk interface (ESDI), integrated drive electronics (IDE), peripheral component interconnect-express (PCI-E), advanced technology attachment (ATA), serial ATA (SATA), parallel ATA (PATA), a serial attached SCSI (SAS), and a universal serial bus (USB).

The semiconductor system 2200 may include a controller 2300 and semiconductor devices 2400 (1: K). The controller 2300 may include the memory controller 61 described with reference to FIG. 19. The semiconductor devices 2400 (1: K) may each include the memory module 1 described with reference to FIG. 1 and the memory module 63 described with reference to FIG. 19. The semiconductor devices 2400 (1: K) may each be implemented as one of dynamic random access memory (DRAM), phase change random access memory (PRAM), resistive random access memory (RRAM), magnetic random access memory (MRAM), and ferroelectric random access memory (FRAM).

The embodiments of the present disclosure have been described so far. A person having ordinary knowledge in the art to which the present disclosure pertains will understand that the present disclosure may be implemented in a modified form without departing from an intrinsic characteristic of the present disclosure. Accordingly, the disclosed embodiments should be considered from a descriptive viewpoint, not from a limitative viewpoint. The range of the present disclosure is described in the claims not the aforementioned description, and all differences within an equivalent range thereof should be construed as being included in the present disclosure.

What is claimed is:

1. A memory module comprising:
a clock driver configured to receive an external clock through a module pin and configured to generate an internal clock that is transmitted to memory chips by delaying a division clock that is generated from the external clock by a clock delay interval,
wherein the clock driver adjusts the clock delay interval by comparing a phase of the division clock and a phase of a feedback division clock that is generated from the internal clock.

2. The memory module of claim 1, wherein:
the clock driver generates the division clock based on the external clock,
the division clock is set to have a cycle that is "2N" times greater than a cycle of the external clock, and
the "N" is set as a natural number.

3. The memory module of claim 1, wherein the clock driver comprises a phase detection circuit configured to generate a delay control signal by comparing the phases of the division clock and the feedback division clock.

4. The memory module of claim 3, wherein the phase detection circuit compares the phases of the division clock and the feedback division clock and generates the delay control signal having a logic level of which is determined based on a result of the comparison, or generates the delay control signal comprising bits a logic bit set of which is determined based on the result of the comparison.

5. The memory module of claim 3, further comprising a clock delay circuit configured to generate a selection delay division clock by delaying the division clock by the clock delay interval that is set based on the delay control signal and a driving control signal.

6. The memory module of claim 5, wherein the clock delay circuit comprises:
a first delay division clock generation circuit configured to generate a first delay division clock by delaying the division clock by a first sub-delay interval based on the delay control signal;
a second delay division clock generation circuit configured to generate a second delay division clock by delaying the division clock by a second sub-delay interval based on the delay control signal; and
a delay division clock driving circuit configured to drive the selection delay division clock based on the driving control signal.

7. The memory module of claim 6, wherein each of the first delay division clock generation circuit and the second delay division clock generation circuit comprises multiple unit delayers each having a unit delay interval.

8. The memory module of claim 6, wherein an initial delay interval of the second sub-delay interval, which is set in the second delay division clock generation circuit, is set to be greater than an initial delay interval of the first sub-delay interval, which is set in the first delay division clock generation circuit.

9. The memory module of claim 6, wherein the delay division clock driving circuit drives the selection delay division clock so that the clock delay interval is set as an interval between the first sub-delay interval and the second sub-delay interval.

10. The memory module of claim 6, wherein:
the driving control signal comprises a first driving control signal and a second driving control signal,
the delay division clock driving circuit comprises:
a first clock driving circuit configured to receive the first delay division clock and configured to drive the selection delay division clock by a first driving power that is set by the first driving control signal; and
a second clock driving circuit configured to receive the second delay division clock and configured to drive the selection delay division clock by a second driving power that is set by the second driving control signal.

11. The memory module of claim 5, further comprising a clock transmission circuit configured to generate the internal clock based on the selection delay division clock and configured to output the internal clock to an internal clock pad to transmit the internal clock to the memory chips.

12. The memory module of claim 5, wherein the clock delay circuit comprises:
a delay division clock generation circuit configured to generate a first delay division clock by delaying the division clock by a first sub-delay interval based on the delay control signal and configured to generate a second delay division clock by delaying the division clock by a second sub-delay interval based on the delay control signal; and
a delay division clock driving circuit configured to drive the selection delay division clock based on the driving control signal.

13. The memory module of claim 12, wherein the delay division clock generation circuit comprises multiple unit delayers each having a unit delay interval.

14. A memory module comprising:
a clock driver configured to receive an external clock through a module pin and configured to generate an internal clock that is transmitted to memory chips by delaying a division clock that is generated from the external clock by a clock delay interval,
wherein the clock driver adjusts the clock delay interval by comparing a phase of an external buffer clock that is generated from the external clock and a phase of a feedback buffer clock that is generated from the internal clock.

15. The memory module of claim 14, wherein the clock driver comprises:
a clock buffer configured to generate the external buffer clock by buffering the external clock; and
a feedback buffer configured to generate the feedback buffer clock by buffering the internal clock.

16. The memory module of claim 15, wherein the clock driver comprises a phase detection circuit configured to generate a delay control signal by comparing the phases of the external buffer clock and the feedback buffer clock.

17. The memory module of claim 16, further comprising a clock delay circuit configured to generate a selection delay division clock by delaying the division clock by the clock delay interval that is set based on the delay control signal and a driving control signal.

18. A memory module comprising:
a clock driver configured to receive an external clock through a module pin and configured to generate an internal clock that is transmitted to memory chips by delaying a division clock that is generated from the external clock by a clock delay interval,
wherein the clock driver comprises:
a first phase detection circuit configured to generate a first delay control signal by comparing phases of the division clock and a feedback division clock;
a first clock delay circuit configured to generate a first selection delay division clock by delaying the division clock by a first clock delay interval that is set based on the first delay control signal and a driving control signal;
a second phase detection circuit configured to generate a second delay control signal by comparing the phases of the division clock and the feedback division clock; and
a second clock delay circuit configured to generate a second selection delay division clock by delaying the division clock by a second clock delay interval that is set based on the second delay control signal and the driving control signal.

19. A memory module comprising:
a clock driver configured to receive an external clock through a module pin and configured to generate an internal clock that is transmitted to memory chips by delaying a division clock that is generated from the external clock by a clock delay interval,
wherein the clock driver comprises:
a phase detection circuit configured to generate a delay control signal by comparing phases of the division clock and a feedback division clock;
a first clock delay circuit configured to generate a first selection delay division clock by delaying the division clock by a first clock delay interval that is set based on the delay control signal and a driving control signal; and
a second clock delay circuit configured to generate a second selection delay division clock by delaying the division clock by a second clock delay interval that is set based on the delay control signal and the driving control signal.

20. A memory module comprising:
a clock driver configured to receive an external clock through a module pin and configured to generate an internal clock that is transmitted to memory chips by delaying an external buffer clock that is generated from the external clock by a clock delay interval,
wherein the clock driver adjusts the clock delay interval by comparing a phase of the external buffer clock and a phase of a feedback buffer clock that is generated from the internal clock.

* * * * *